(12) United States Patent
Yamashita et al.

(10) Patent No.: US 6,580,541 B1
(45) Date of Patent: Jun. 17, 2003

(54) SYSTEM AND METHOD FOR TRANSMITTING INFORMATION FOR AMPHIBIOUS TRAVELING VEHICLE AND SYSTEM FOR CONTROLLING OPERATION OF THE VEHICLE

(75) Inventors: Katsumi Yamashita, Yamaguchi (JP); Kenjiro Futami, Shimonoseki (JP)

(73) Assignee: Koyo Engineering Co., Ltd., Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/155,005
(22) PCT Filed: Apr. 18, 1997
(86) PCT No.: PCT/JP97/01357
§ 371 (c)(1),
(2), (4) Date: Dec. 18, 1998
(87) PCT Pub. No.: WO98/31182
PCT Pub. Date: Jul. 16, 1998

(30) Foreign Application Priority Data

Jan. 13, 1997 (JP) .............................................. 9-003842

(51) Int. Cl.⁷ .......................... H04B 10/00; H04B 10/10
(52) U.S. Cl. ....................... 359/141; 359/143; 359/144; 359/152; 359/154; 359/172
(58) Field of Search ................................. 359/142, 141; 104/71; 342/53, 54

(56) References Cited

U.S. PATENT DOCUMENTS

| 1,849,226 A | * | 3/1932 | Erban ........................... 104/71 |
| 4,302,291 A | * | 11/1981 | Severs et al. ................. 376/293 |
| 4,680,811 A | * | 7/1987 | Harper et al. ................ 455/617 |
| 5,583,844 A | | | |
| 5,583,844 A | * | 12/1996 | Wolf et al. ............ 364/423.98 |
| 5,669,821 A | * | 9/1997 | Prather et al. .................. 104/78 |
| 5,775,226 A | * | 7/1998 | Futami et al. ................. 104/71 |
| 6,058,848 A | * | 5/2000 | Futami et al. ................. 104/71 |

* cited by examiner

Primary Examiner—Leslie Pascal
Assistant Examiner—Agustin Bello
(74) Attorney, Agent, or Firm—Koda & Androlia

(57) ABSTRACT

In order to allow an amphibious traveling vehicle to safely travel along rails on the land and in the water, or underwater even off the rails, a system for transmitting information of amphibious traveling vehicle comprising a traveling vehicle-side control system (51) which controls the operating state of the traveling vehicle and is provided on the traveling vehicle for traveling under water or underwater and in the air, a host-side control system (53) which instructs the system (51) to operate the traveling vehicle and is provided separately from the traveling vehicle, and communication means (60 and 61) which transmit information between the systems (51 and 53) and are connected to these systems (51 and 53), said system being characterized in that said communication means (60 and 61) is constituted of modulators (54 and 55) which modulate received instruction information into light beams, demodulators (56 and 57) which demodulate received beams of light into the instruction information and a light beam transmitter/receiver (58 and 59), wherein the information transmission between the systems (51 and 53) can be performed with light beams.

10 Claims, 18 Drawing Sheets (a)

(b)

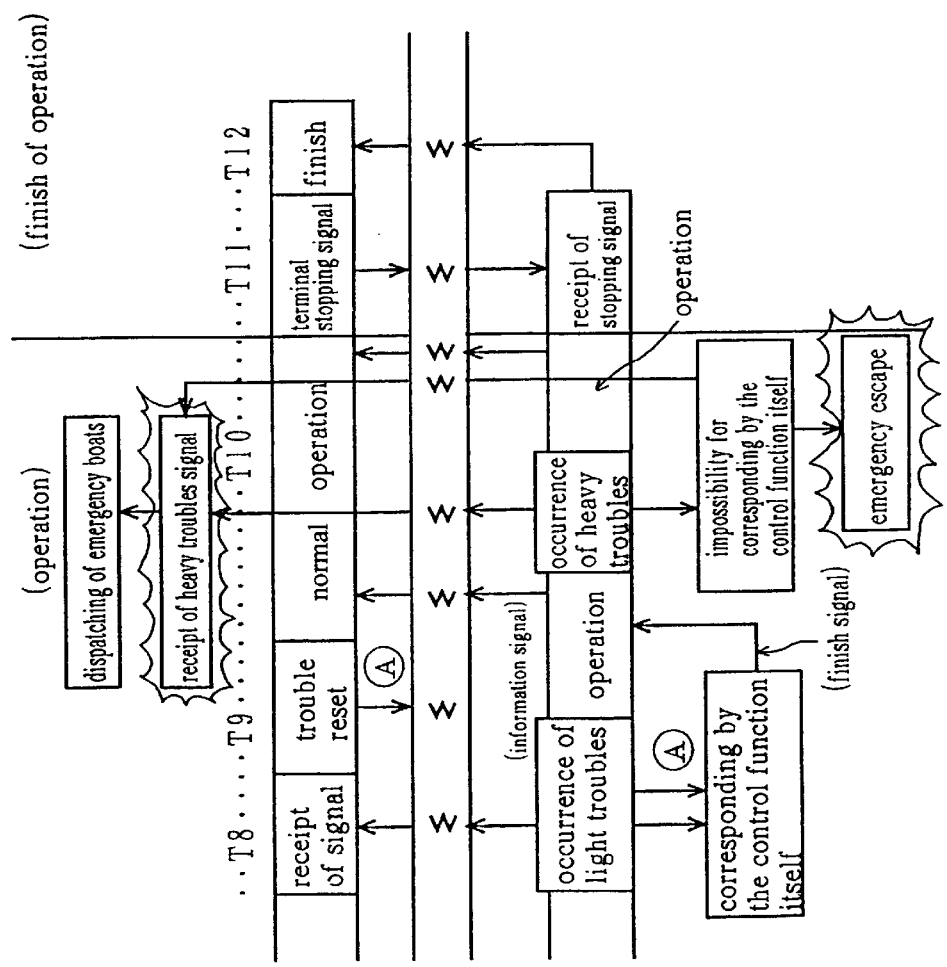

SYSTEM AND METHOD FOR TRANSMITTING INFORMATION FOR AMPHIBIOUS TRAVELING VEHICLE AND SYSTEM FOR CONTROLLING OPERATION OF THE VEHICLE

TECHNICAL FIELD

This invention relates to a system and method for transmitting information for amphibious traveling vehicle and a system for controlling operation of said vehicle, more specifically to an information transferring system, an information transferring method and an operation control system for the amphibious traveling vehicles, which enable to travel between land and underwater along a travel rails, to move underwater after leaving said rails as well as to assure a safe operation of such vehicles as described above.

BACKGROUND TECHNICS

In general, ships have been heretofore used for the purpose of sailing on the surface of waters such as sea and lakes carrying persons and cargoes, while a specific type of ships having their bottom constituted from glass or submarines for the purpose of enjoying the underwater scenes.

However, said types of ship or said submarines present such inconveniences that they can not operate in the stormy weather, thereby not to sufficiently satisfy the tourists. Further, the passengers must move to such facilities as landing piers for getting on and off said vehicles with inconveniences and dangers for passengers, which constitutes another problem.

Further, since information can not be readily transferred underwater to the outside by means of usual radio means due to a higher density of transferring medium than that of air, a more reliable and more effective information transferring means is necessary.

For eliminating such problems, the embodiment of the present invention provides an amphibious traveling vehicle which can be moved reliably and safely from on the land into the water irrespective of the weather and other bad conditions. Further, the embodiment of the present invention provides a system and method for transmitting information for amphibious traveling vehicle and a system for controlling operation of the vehicle such as said vehicle can be operated suitably with a higher safety so as to cause crew and passengers to escape reliably even in the case of troubles in the water, with information transmission carried out in a same procedure whether in the water or in the air.

DISCLOSURE OF THE INVENTION

For achieving the above described objects, the system for transmitting information of amphibious traveling vehicle according to the present invention comprises a traveling vehicle-side control system which controls the operating state of the traveling vehicle and is provided on the traveling vehicle for traveling under water or underwater and in the air, a host-side control system which instructs the system to operate the traveling vehicle and is provided separately from the traveling vehicle, and communication means which transmits information between the systems and are connected to the systems , said system being characterized in that said communication means is constituted of modulators which modulate received instruction information into light beams, demodulators which demodulate received beams of light into the instruction information and a light beam transmitter/receiver, wherein the information transmission between the systems can be performed with light beams including near infrared beam or visible light beam of green-blue color system. As a result of adopting such a construction, information can be transmitted with the same process irrespective of in the water or in the air.

Said system for transmitting information of amphibious traveling vehicle according to the present invention is characterized in that said light beam transmitter/receiver on said vehicle-side control system comprises light shower movable station which generates light beams in radiation manner, while said light beam transmitter/receiver on said host-side control system comprises light shower fixed station which generates light beams in radiation manner. With this construction, light beam can be radiated in a large scope, so that information transmission can be realized more reliably.

Said system for transmitting information of amphibious traveling vehicle according to the present invention is characterized in that said communication means of said vehicle-side control system has connected thereto control means for controlling the operation of respective elements mounted on said traveling vehicle, while said communication means of said host-side control system has connected thereto a host-side control center for outputting operation instructions to said vehicle-side control system. With such a construction, control instruction from said control means and said host-side control center can be transmitted by means of light beams such as near infrared beam and the like.

Said system for transmitting information of amphibious traveling vehicle according to the present invention is characterized in that said control means of said vehicle control system comprises decision executing means, supervising means and storing means, wherein said supervising means is formed so as to permanently supervise the actual states of respective elements mounted on said amphibious traveling vehicle and to output obtained data to said decision executing means, wherein said storing means stores therein operation contents of said control means such as communication method with said host-side control system, decision criteria and decision method of respective check lists and operation contents of said control means such as outputting method to said elements, while said decision executing means decides said respective check lists in the case of receiving instructions from said host-side control system or depending on the independent decision of vehicle side based upon programs contained in said storing means, thereby to output the decision results to said host-side control system through said communication means and to output operation instructions to said respective elements corresponding to said decision contents when receiving said operation instructions from said host-side control system or depending on the independent decision of vehicle side based upon programs contained in said storing means; and/or in that said host-side control center comprises a decision executing means, a storing means and a traveling state displaying means, wherein said storing means stores therein such operation contents of said control means as communication method with said vehicle-side control system, decision criteria and decision method of respective check lists, contents of operation instructions to respective elements based on the obtained decision results and operation contents of said control means, while said decision executing means decides said respective check lists when received various instructions from said vehicle-side control system, based upon programs contained in said storing means, thereby to output operation instructions to said respective elements corresponding to said decision results; while said traveling state displaying means displays by means of voice and images the information about decision results and instruction contents of said decision executing means and about supervising results obtained by said supervising means. By such a construction, said vehicle-side control system and said host-side control system can be more widely applied and control instructions to various elements can be transmitted by light beam irrespective of in the air or in the water.

Said system for transmitting information of amphibious traveling vehicle according to the present invention is characterized in that said host-side control center has connected thereto an information unifying means for analyzing, arranging and storing various input/output information. Due to the construction as described above, enormous information and noises and the like can be smoothly processed.

Said system for transmitting information of amphibious traveling vehicle according to the present invention is characterized in that a traveling rail is laid in the water or from on the land into the water, said amphibious traveling vehicle is movably mounted on said rail, and said light beam transmitter/receivers of said host-side control system are arranged along said traveling rail so as to carry out transmission to and reception from said respective light beam transmitter/receivers of said vehicle-side control systems of said amphibious traveling vehicles. Under such a construction, said vehicle traveling along a predetermined rail can be controlled with near infrared beam and the like.

Said system for transmitting information of amphibious traveling vehicle according to the present invention is characterized in that said amphibious traveling vehicle is constructed from a vehicle body moving along said traveling rail and a vehicle capsule mounted detachably on the upper side of said vehicle body, and said vehicle body and said vehicle capsule are respectively provided with said communication means and said control means of said vehicle side control system, wherein said light beam transmitter/receivers of said host-side control system are arranged in the positions where they can carry out a bilateral transmission/reception with said light beam transmitter/receiver of said vehicle capsule. By adopting such a construction, not only said movement of said traveling vehicle traveling along a predetermined rail, but also the movement of said vehicle capsule separated from its vehicle body can be controlled independently.

Said system for transmitting information of amphibious traveling vehicle according to the present invention is characterized in that said amphibious traveling vehicle is constructed from a vehicle body moving along said travel rail and a vehicle capsule mounted detachably on the upper side of said vehicle body, and said vehicle body and said vehicle capsule are respectively provided with said communication means and said control means of said vehicle side control system, wherein said vehicle body is provided with control means and communication means for transmitting by light beams the operation instruction information transmitted from said host-side control system to said vehicle capsule which has left said vehicle body. By adopting such a construction, the movement of said vehicle capsule can be controlled through said vehicle body without providing light beam transmitter/receiver of said host-side control system wide area.

Said system for transmitting information of amphibious traveling vehicle according to the present invention is characterized in that said light beam transmitter/receiver connected to said vehicle-side control system and said light beam transmitter/receiver connected to said host-side control system comprise a pair of light beam transmitter/receivers constituted from a light beam transmitter/receiver for control use to transmit and receive control light beam concerning to operation control of said amphibious traveling vehicle and a light beam transmitter receiver for voice and images to transmit and receive light beams for voice and images. By this construction, both information concerning to control instruction and information concerning to voice and images can be respectively carried out smoothly.

Said system for transmitting information of amphibious traveling vehicle is characterized in that a radio LAN transmitter/receiver is connected to the control means of said vehicle-side control system, wherein transmission of instruction information from said host-side control system in the case of said amphibious traveling vehicle traveling on the land and on the water surface is carried out by means of selected one of light beams or radio LAN. Under such a construction, it is possible to select the most suitable information transmitting means corresponding to the environment in the water or on the land of said traveling vehicle.

Said method for transmitting information of amphibious traveling vehicle between a vehicle-side control system for controlling the operation state of said vehicle traveling in the water or in the water and in the air and a host-side control system for outputting the vehicle operation instruction to said vehicle side control system, said method is characterized in that a modulator for modulating received instruction information into light beam signals, a demodulator for demodulating received light beam signals into instruction information and a communication means equipped with light beam transmitter/receiver is connected respectively to said vehicle-side control system and said host-side control system, wherein information transmission between said control systems are performed through light beams including near infrared beam or visible light beam of green-blue color system. Due to adoption of such a method, information can be transmitted with the same method irrespectively of in the water or in the air.

Said method for transmitting information of amphibious traveling vehicle according to the present invention, said method is characterized in that for transmission of information, said vehicle-side control system and said host-side control system radiate respectively light beams in a light shower manner. By adopting such a method, a larger range of information transmission can be carried out by means of light beam.

Said operation control system of amphibious traveling vehicle wherein a travel rail is laid to extend from on the land into the water, said amphibious traveling vehicle is movably mounted on said rail, and said vehicle is provided with an emergency escaping device for separating said vehicle capsule from said vehicle body in an emergency, said system is characterized in that said system comprises a traveling vehicle-side control system which controls the operating state of the traveling vehicle and is provided on the traveling vehicle for traveling under water or underwater and in the air, a host-side control system which instructs the system to operate the traveling vehicle and is provided separately from the traveling vehicle, and communication means which transmits information between the systems and are connected to the system. By adopting such a construction, said amphibious traveling vehicle can be moved from on the land into the water reliably and safely irrespective of weather or other conditions.

Said operation control system of amphibious traveling vehicle according to the present invention is characterized in that the communication means of said vehicle-side control system has connected thereto control means for controlling the operation of respective elements mounted on said vehicle body and said vehicle capsule, while said communication means of said host -side control system has connected thereto a host-side control center for outputting operation instructions to said vehicle-side control system. By adopting such a construction, information transmission with said amphibious traveling vehicle can be smoothly carried out, thereby to move said vehicle e reliably and safely.

Said operation control system of amphibious traveling vehicle according to the present invention is characterized in that said control means of said vehicle control system comprises decision executing means, supervising means and storing means, wherein said supervising means is formed so as to permanently supervise the actual states of respective elements mounted on said amphibious traveling vehicle and to output obtained data to said decision executing means, wherein said storing means stores therein operation contents of said control means such as communication method with said host-side control system, decision criteria and decision method of respective check lists and operation contents of said control leans such as outputting method to said elements, while said decision executing means decides said respective check lists in the case of receiving instructions from said host-side control system or depending on the independent decision of vehicle side based upon programs contained in said storing means, thereby to output the decision results to said host-side control system through said communication means and to output operation instructions to said respective elements corresponding to said decision contents when receiving said operation instructions from said host-side control system or depending on the independent decision of vehicle side based upon programs contained in said storing means; and/or in that said host-side control center comprises a decision executing means, a storing means and a traveling state displaying means, wherein said storing means stores therein such operation contents of said control means as communication method with said vehicle-side control system, decision criteria and decision method of respective check lists, contents of operation instructions to respective elements based on the obtained decision results and operation contents of said control means, while said decision executing means decides said respective check lists in the case of receiving instructions from said vehicle-side control system, based upon programs contained in said storing means,thereby to output operation instructions to said respective elements corresponding to said decision results; while said traveling state displaying means displays by said supervising means by means of voice and images the information about decision results and instruction contents of said decision executing means and about supervising results obtained. By adopting such a construction, said host-side control system can reliably control said amphibious traveling vehicle, thereby to assure a safe operation control in the water and on the land.

Said operation control system of amphibious traveling vehicle according to the present invention is characterized in that said host-side control center has connected thereto an information unifying means for analyzing, arranging and storing various input/output information. By adopting such a construction, enormous information and noises and the like can be processed, thereby to carry out reliably the control of said amphibious traveling vehicle.

Said operation control system of amphibious traveling vehicle according to the present invention is characterized in that said emergency escaping device comprises a capsule holding mechanism for holding integrally said vehicle capsule and said vehicle body and for releasing this holding state in an emergency, a wire coupling said vehicle body and said vehicle capsule, and resistance applying means provided on said vehicle body for limiting the withdrawn quantity of said wire. By adopting such a construction, when any trouble is produced during traveling of the vehicle body in the water, the passenger can be allowed to reliably escape from the vehicle, leading to a remarkably enhanced safety.

Said operation control system of amphibious traveling vehicle according to the present invention is characterized in that said communication means consists of a modulator for modulating instruction information received from said vehicle-side control system and said host-side control system into light beam signals, a demodulator for demodulating received light beam signals into instruction information and a light beam transmitter/receiver, and in that information transmission between said control systems are performed through light beams including near infrared beam or visible light beam of green-blue color system. By adopting such a construction, said amphibious traveling vehicle can be controlled reliably irrespective of in the water or in the air.

Said operation control system of amphibious traveling vehicle according to the present invention is characterized in that said light beam transmitter/receiver on said vehicle-side control system comprises light shower movable station which generates light beams in radiation manner, while said light beam transmitter/receiver on said host-side control system comprises light shower fixed station which generates light beams in radiation manner. By adopting such a construction, a wider range of beam radiation is obtained thereby to more reliably control said vehicle with light beam as information transmitting medium.

BRIEF DESCRIPTION OF THE DRAWINGS

FIG. 11(*b*) is an explanatory view of said traveling vehicle when traveling in the water;

THE BEST MODE FOR EMBODYING THE PRESENT INVENTION

Figure 1:
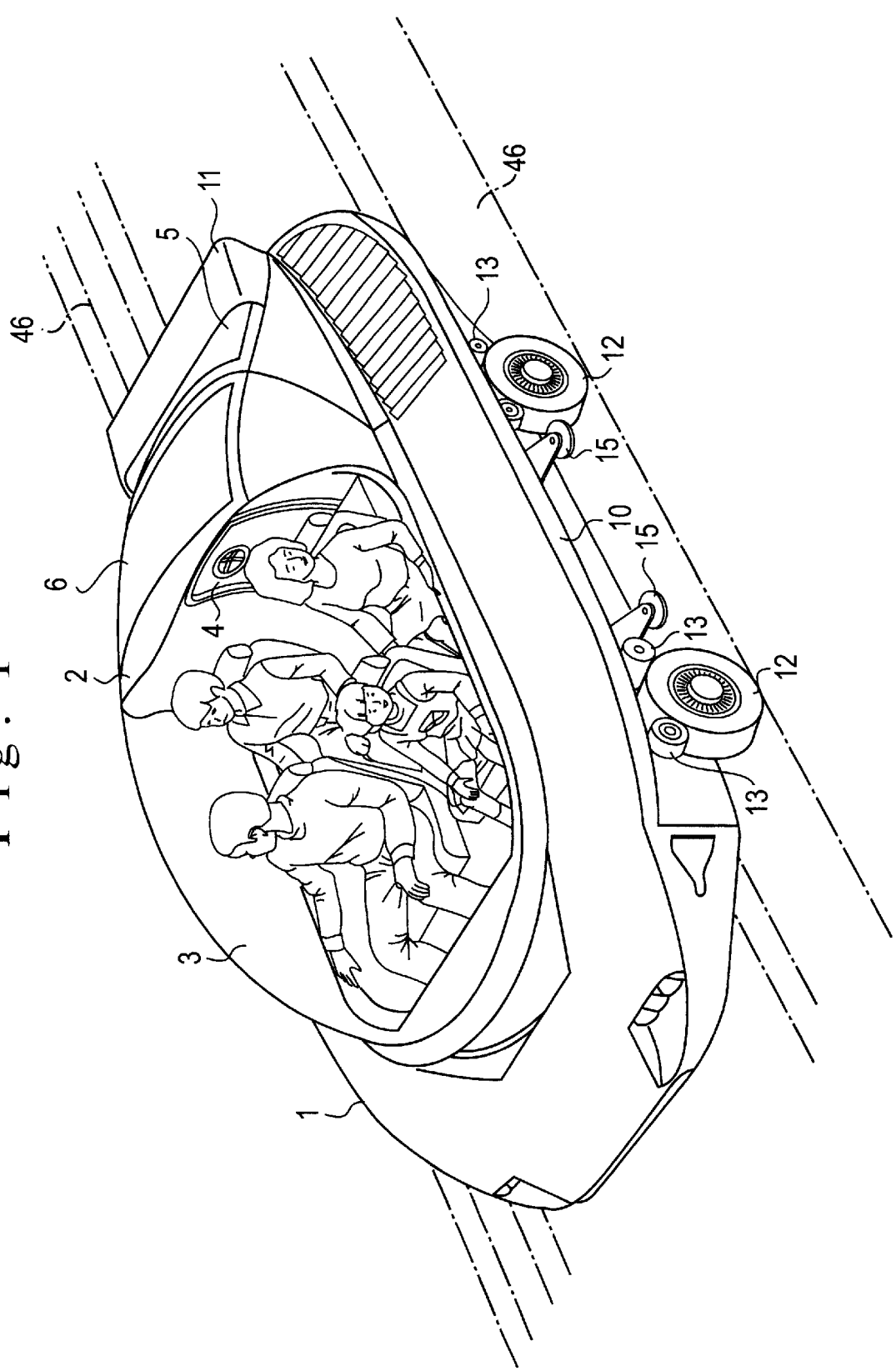
FIG. 1 is a perspective view of an embodiment of an amphibious traveling vehicle on which the operation control system of said vehicle according to the present invention is applied.
Figure 2:
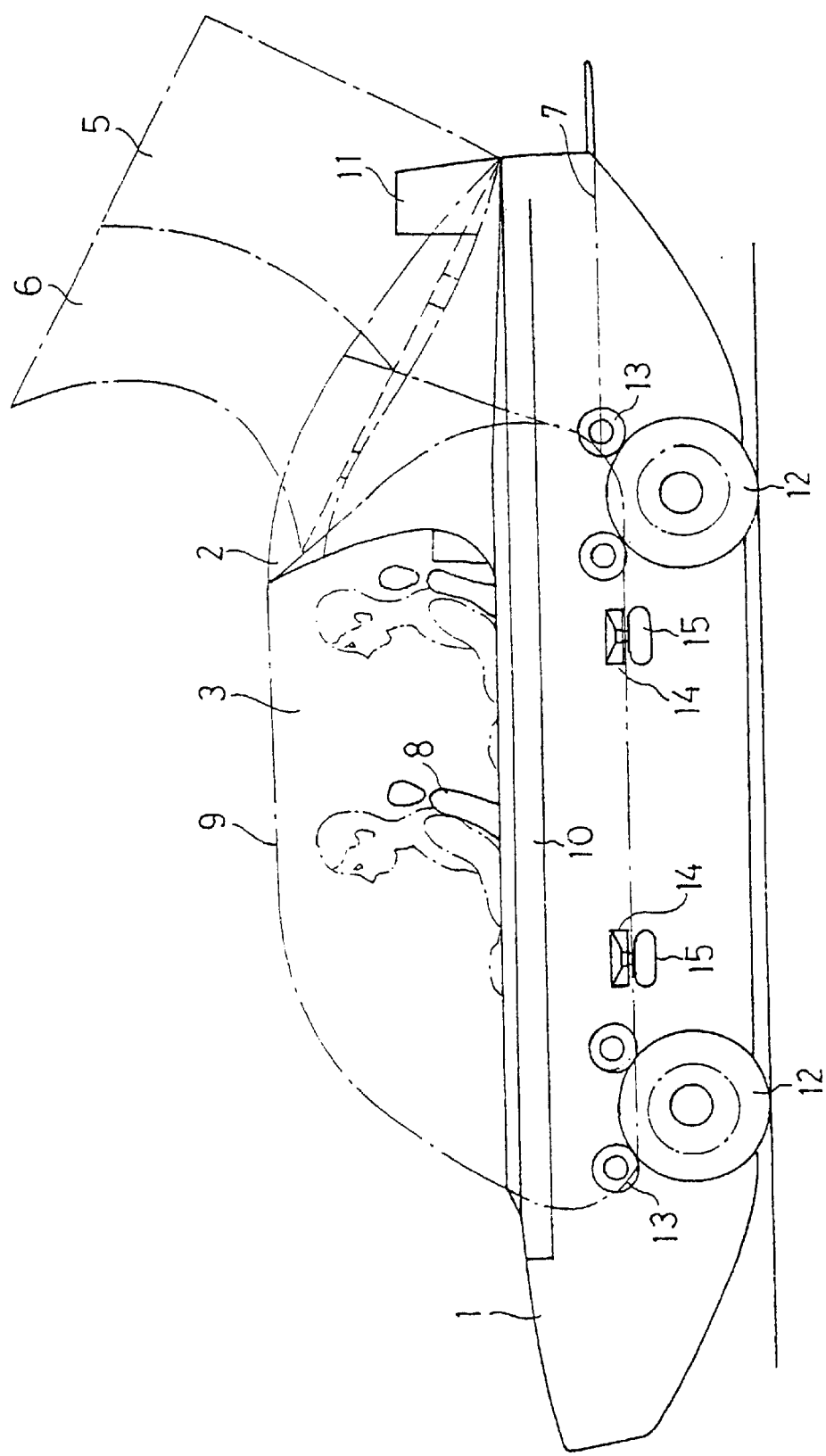
FIG. 2 is a side view of the amphibious traveling vehicle shown in FIG. 1.
Figure 3:
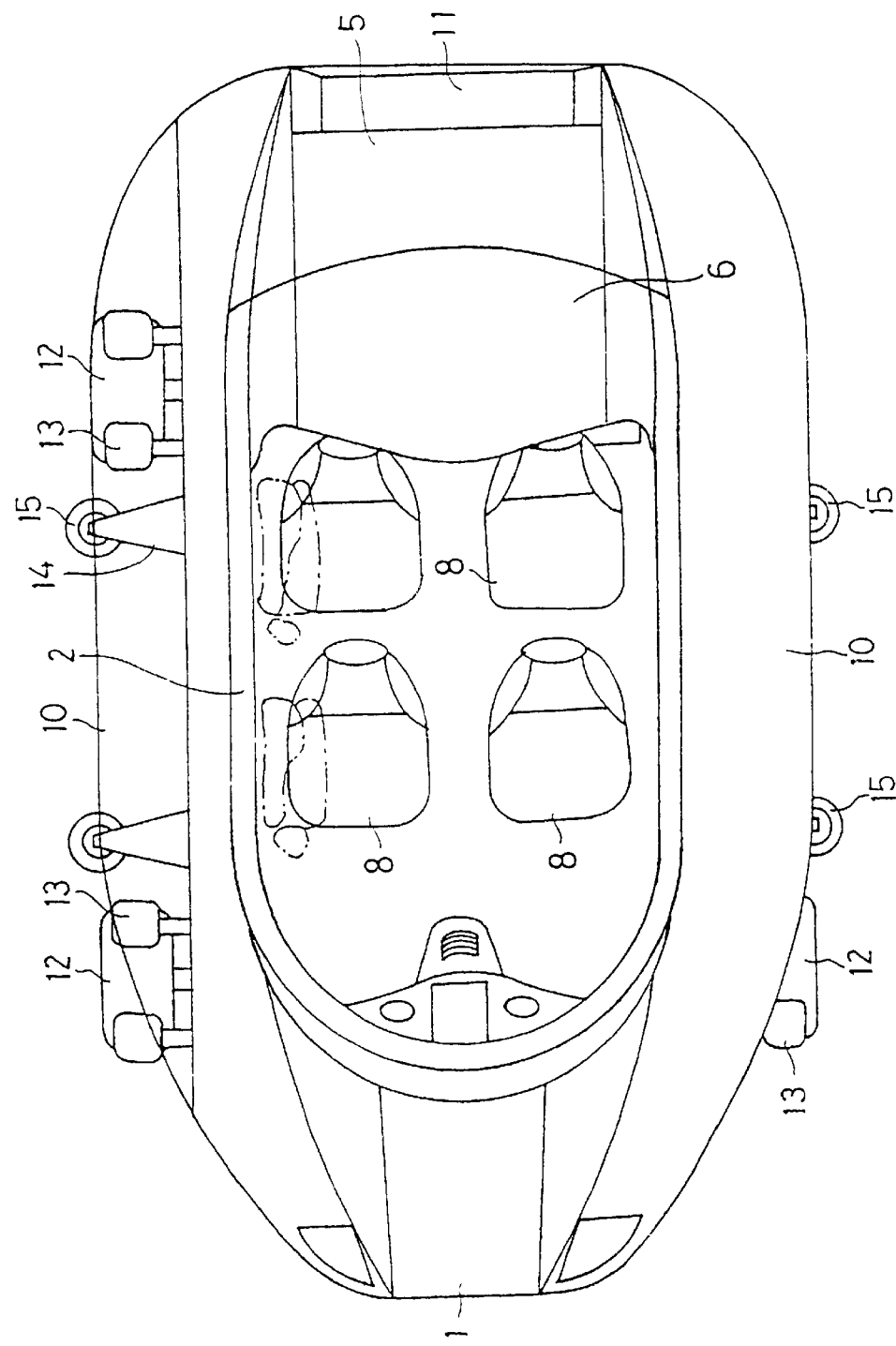
FIG. 3 is a plan view of the amphibious traveling vehicle shown in FIG. 1.
Figure 4:
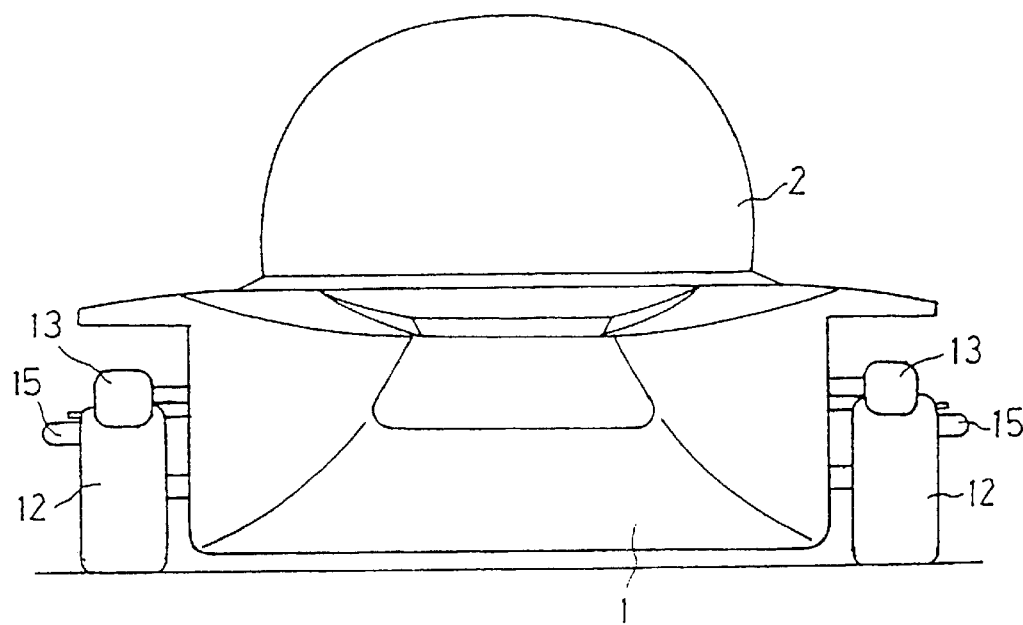
FIG. 4 is a front view of the amphibious traveling vehicle shown in FIG. 1.
Figure 5:
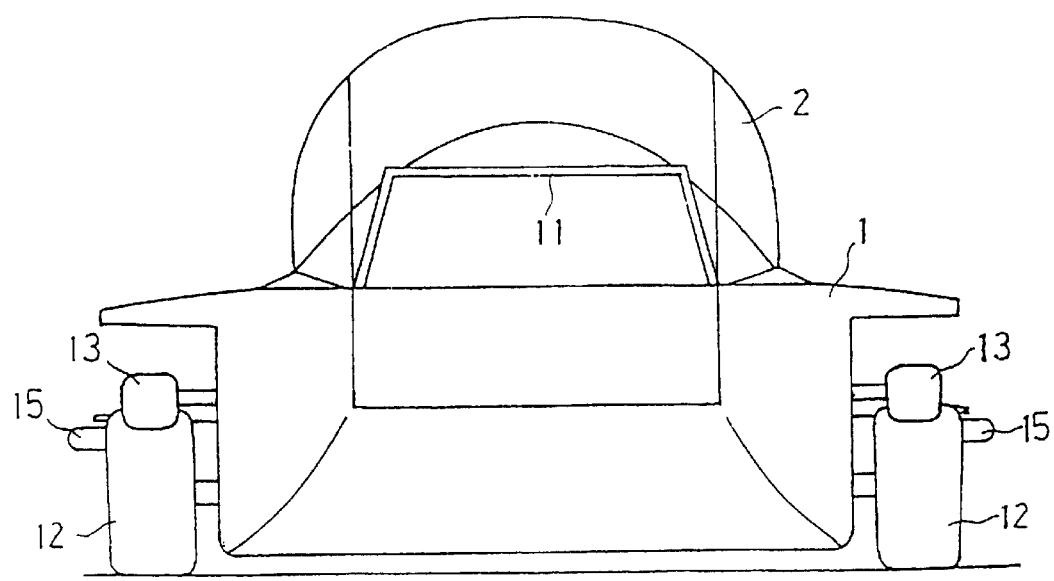
FIG. 5 is a rear side view of the amphibious traveling vehicle shown in FIG. 1.

The best mode for embodying the present invention is now described in detail with reference to FIG. 1 to FIG. 20.

First, a traveling vehicle as one example of the amphibious traveling vehicle according to the invention is described below.

FIG. 1 through FIG. 5 show one embodiment of said underwater and land traveling vehicle having thereon an emergency escaping device as one example of emergency leaving devices. Said traveling vehicle comprises a vehicle body 1 made from such materials as FRP or acrylic resin. A capsule 2 is mounted on said vehicle body 1, said capsule 2 having therein a cabin 3. An inner hatch 4 is located on the rear side of the said cabin 3 in a closable manner for the purpose of partitioning air-tightly the inner and outer sides of said cabin 3, while outer hatches 5 and 6 are provided on the rear side of said vehicle body 1 and said vehicle capsule 2 respectively in such a manner to be able to be shut and opened around their one edge. A step 7 for the passengers mounting on or descending from said vehicle body 1 is located below said vehicle body 1 between the inner side of said outer hatches 5, 6 and said inner hatch 4 of said capsule 2.

Further, a plurality of seats 8 are arranged in two rows in the interior of said cabin 3, while a window 9 made from transparent materials such as pressure-tight glass and the like is integrally mounted on the upper side of said cabin 3. Said window 9 allows crew and passengers to survey the front, upper and lateral sides from the interior of said cabin 3.

A wing-like side cover 10 is integrally formed and protrudes laterally along the upper end of both side surfaces of said vehicle body 1, while a laterally extending wing 11 is provided along the lower side edge of said outer hatches 5, 6 so as to have a predetermined distance from the surfaces of said hatches 5, 6. Four main tires 12,12 . . . . are mounted on the lower side surface of said side cover 10 of said vehicle body 1, and according to the invention, respective two auxiliary tires 13 of small diameter are rotatively mounted on the upper side surface of each of said main tires 12 so that the peripheral surface of said auxiliary tires 13 is applied on that of said main tire 12, wherein the upper side surfaces of said auxiliary tires 13 are arranged on the same level. Respective guide arms 14 is provided so as to laterally project along the both side surfaces of said vehicle body between said two main tires 12 arranged in a row. Respective guide tires 15 are rotatively fixed on an end of said guide arms 14 so as to project from the outer side surface of said main tires 12.

Figure 6:
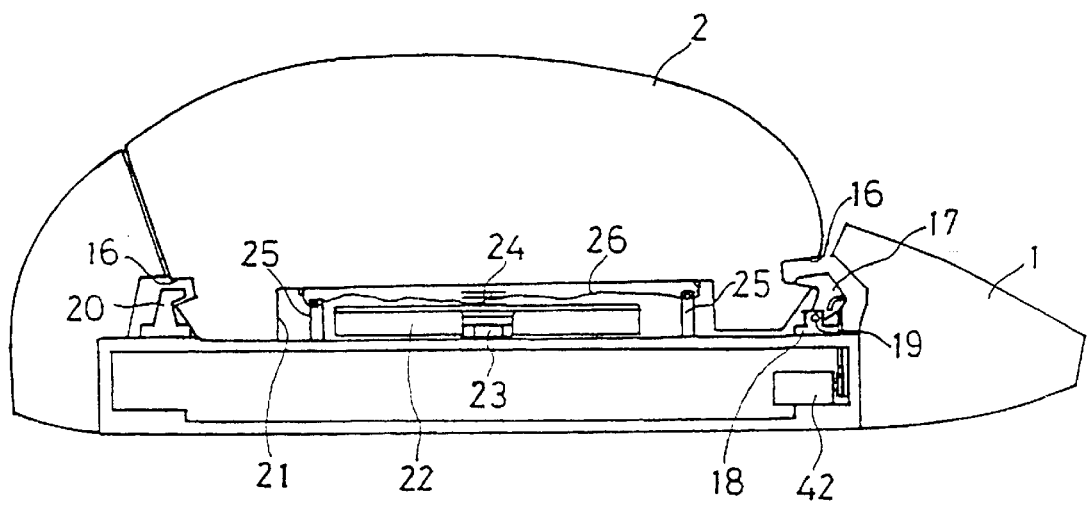
FIG. 6 is a longitudinal cross section of an embodiment of an emergency escaping device.
Figure 7:
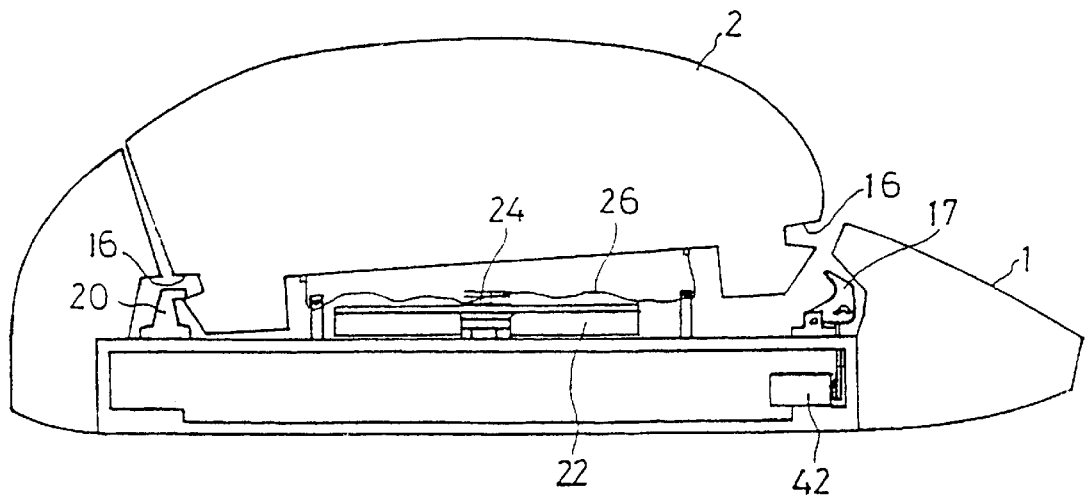
FIG. 7 is an explanatory view of a removed state of movable hook of an emergency escaping device.
Figure 8:
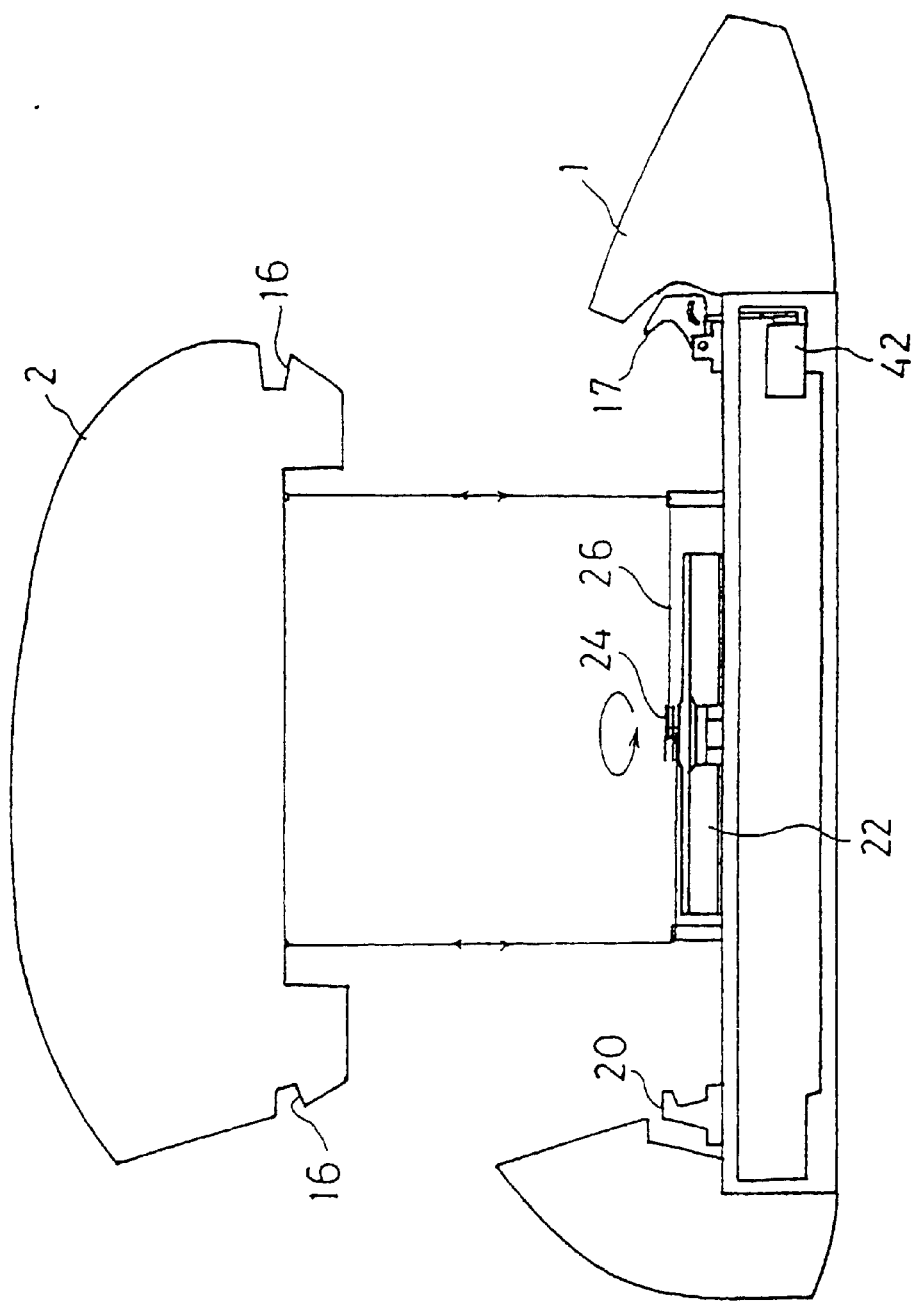
FIG. 8 is an explanatory view of the vehicle capsule removing state of a removing device.

In an embodiment of the present invention shown in FIG. 6 to FIG. 8, respective engaging slots 16, 16 as capsule holding members are provided in the front and rear portions of said vehicle capsule 2, wherein the number of said engaging slots may be one or plural. A movable hook 17 is provided in the position corresponding to the front engaging slot 16 for engaging therein so as to be oscillated in the longitudinal direction around a supporting pin 19 fixed in a base 18, while a fixed hook 20 is provided in the position corresponding to the rear side engaging slot 16 for engaging therein. In such a construction, when said movable hook 17 is oscillated to be disengaged from said front engaging slot 16, said capsule 2 can be separated from said vehicle body 1.

A cavity 21 is formed in the central portion of underside surface of said capsule 2, and a fluid fin 22 is provided in the upper surface of said vehicle body 1 in the position corresponding to said cavity 21 so as to rotate around a rotary shaft 23. A rotary pulley 24 is mounted rotatively on the top end of said rotary shaft 23 of said fluid fin 22, while wire guides 25 are respectively provided in the front and rear sides of said fluid fin 22. A predetermined length of wire 26 is connected between the front and rear portions of said cavity 21 of said capsule 2, said wire 26 being wound around said rotary pulley 24 in the same direction through said respective wire guides 25. Further as described below shifting of said capsule 2 may be controlled without connecting said capsule 2 with said vehicle body 1 by means of said wire 26.

Figure 9:
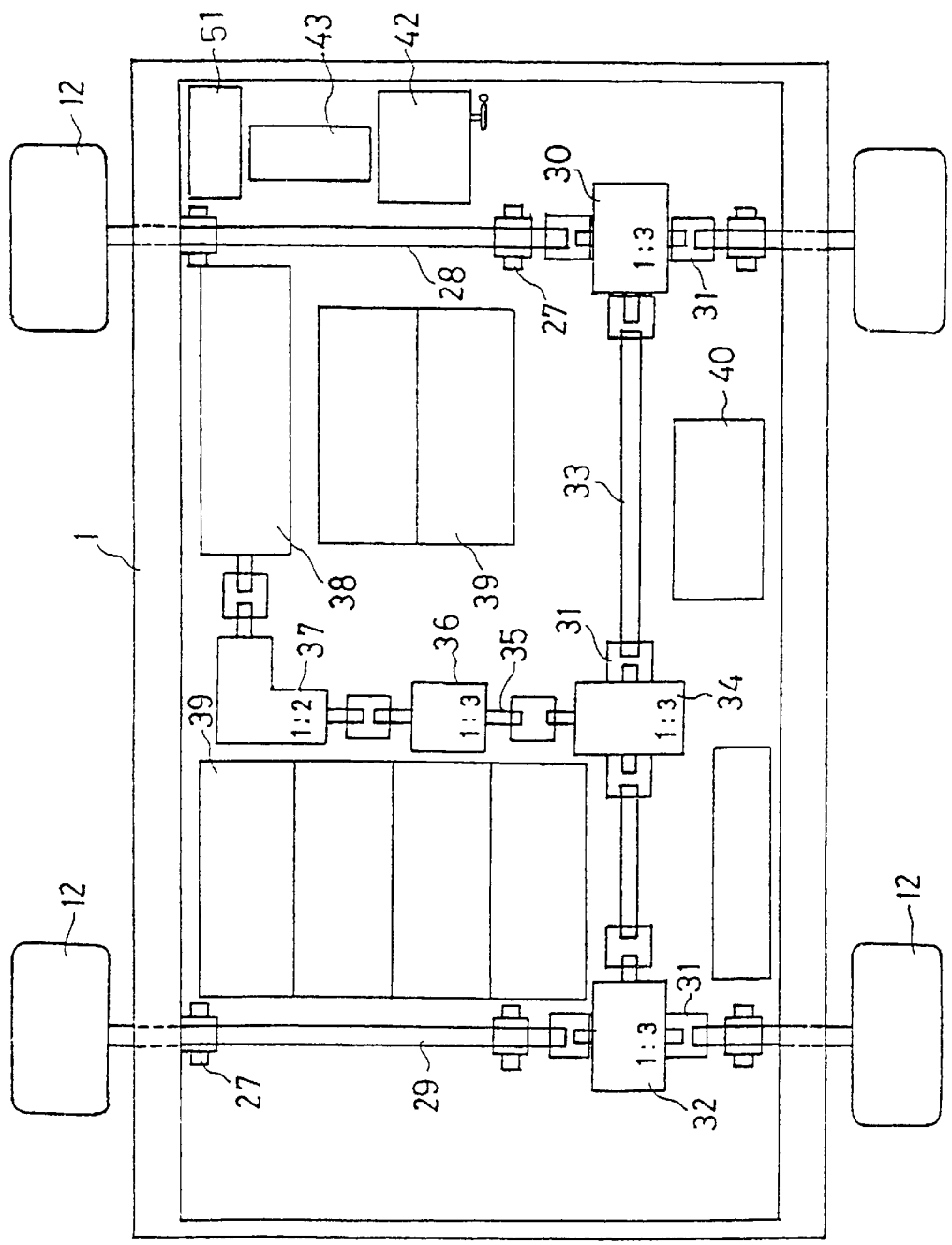
FIG. 9 is a schematic circuit diagram showing the internal elements of said amphibious traveling vehicle shown in FIG. 1.

In the interior of said vehicle body 1 shown in FIG. 9, there are provided respectively a front driving shaft 28 journaled rotatively in bearings 27 and having said front main tires 12 fixed on its both end portions and a rear driving shaft 29 having said rear main tires 12 fixed on its end portions; front differential gear 30 being mounted at the middle portion of said front driving shaft 28 through couplings 31, while rear differential gear 32 being mounted at the middle portion of said rear driving shaft 29 through couplings 31. Said differential gears 30, 32 are connected with each other by means of a driving shaft 33, and a center differential gear 34 is connected at the middle portion of said driving shaft 33 by means of couplings 31. A transmission shaft 35 is connected with said center differential gear 34, and a gear box 36 is connected at the middle portion of said transmission shaft 35. A bevel gear box 37 is connected to said gear box 36 in order to change the direction of said transmission shaft 35 by the angle of 90 degrees, and an output shaft of driving motor 38 is connected to said bevel gear box 37. Rotational driving effect of said driving motor 38 drives said front driving shaft 28 and said rear driving shaft 29 respectively through said bevel gear box 37, gear box 36, center differential gear 34, said front differential gear 30 and said rear differential gear 32, thereby to drive respective main tires 12. Further, a plurality of batteries 39 for feeding electricity to said driving motor 38 and a driving control device 40 for controlling said driving motor 38 are installed within the gaps in the driving mechanism contained in said vehicle body 1. Further, according to another embodiments of the present invention, said vehicle body 1 is automatically controlled through a traveling vehicle-side controlling system 51 contained in said vehicle body 1 by means of remote control using near infrared radiation. Further, an actuator 42 for rotating said movable hook 17 is provided within said vehicle body 1, together with batteries 43 for driving said actuator 42. Operation of said actuator 42 causes the oscillation of said hook 17 thereby to release the engagement of said hook 17 in said engaging slot 16. In this case, the operation of said actuator 42 may be carried out either through such remote control as used for vehicle traveling operation or through manual operation from crews in said capsule 2.

In a further embodiment of the invention, a water inlet and a water outlet not shown in the drawings are provided respectively in the font and rear portions of said vehicle body 1, so that it may be a wetted type vehicle which is flooded with water when traveling in the water. For taking this into consideration, said driving mechanism, said batteries and the like have water-proof construction.

Figure 10:
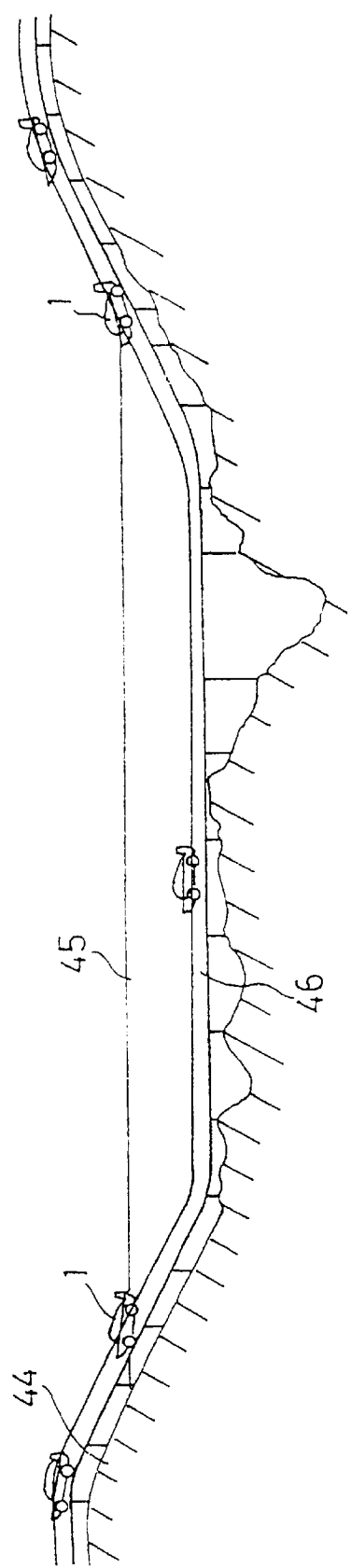
FIG. 10 is an explanatory view of the traveling system for said amphibious traveling vehicle.

FIG. 10 shows an example of traveling system for said vehicle body 1 having the construction as described above. Said traveling system comprises a rail 46 which is laid from on the land 44 into the water 45 such as sea. Said rail 46 may be a single straight one on which said vehicle body 1 can be moved back and forth, or otherwise may be a circular rail on which said traveling vehicle can be moved in a cyclic path.

Figure 11:
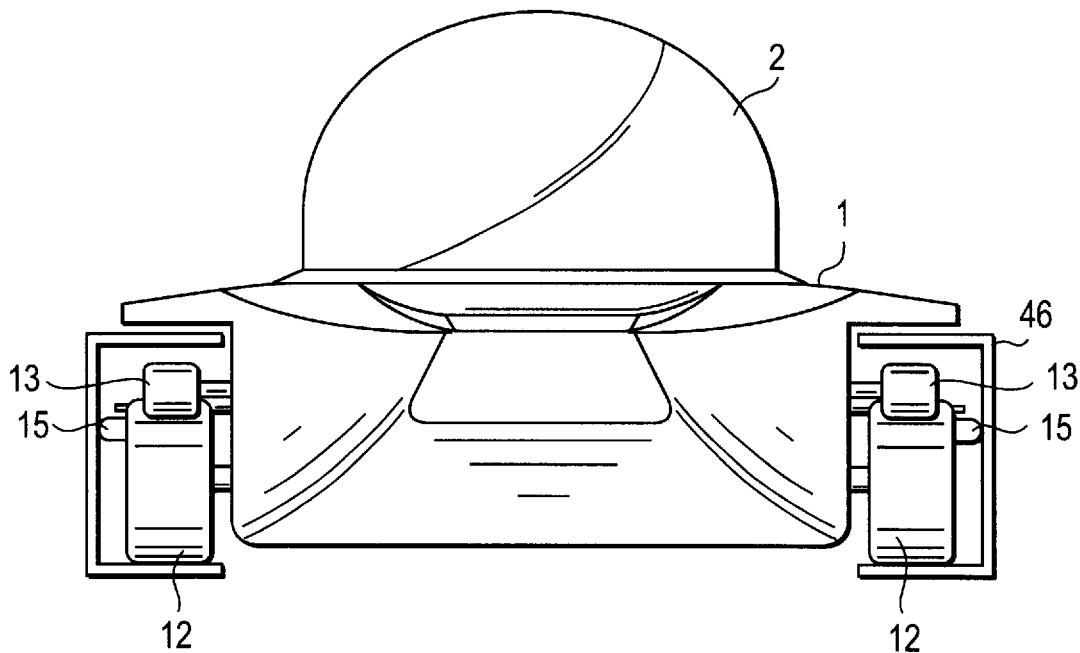
FIG. 11(*a*) is an explanatory view of said traveling vehicle when traveling on the land.
Figure 11:
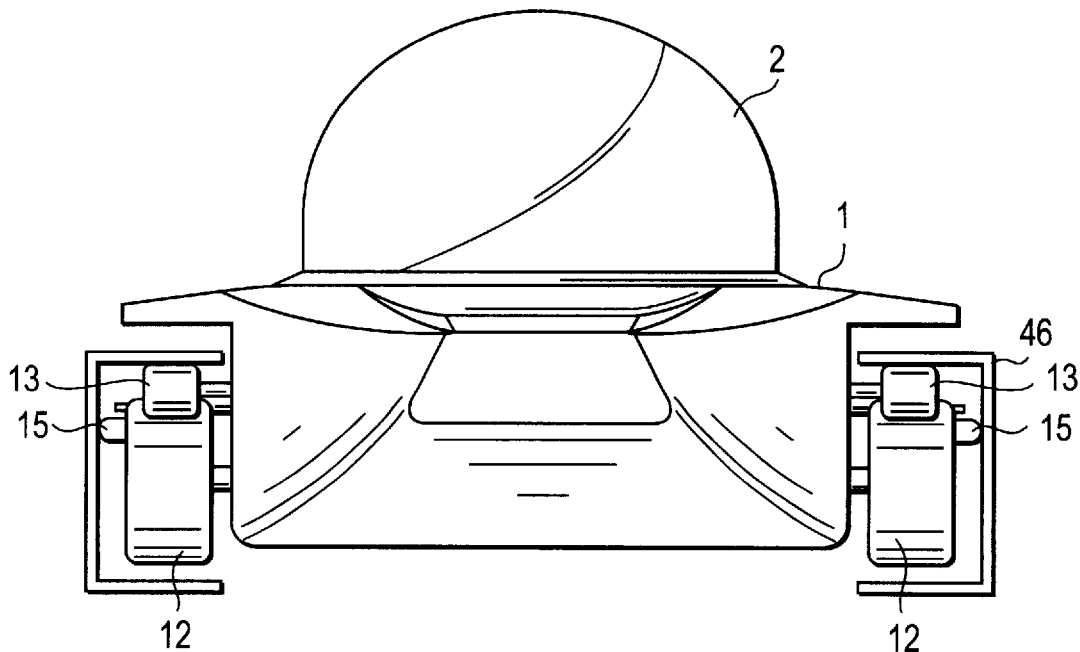

More specifically, said rail 46 has a C-type cross-section as shown in FIG. 11 and is laid with said C-type cross-sections on both sides opposed to each other. Said main tires 12 and said auxiliary tires 13 are mounted within said rail 46, so that said vehicle body 1 is carried by said rail 46, wherein said guide tires 15 on both sides are applied on the inner side surface of respective Cl type members of said rail 46.

Although said rail 46 comprises two members each having C-form cross-section, said rail may have any form which has at least a upper surface in the water 45 and at least a bottom surface on the land 44. Further, when traveling on the land 44, said vehicle body 1 may run on a road surface in place of said rail 46. Although a pair of rail members are located on both sides of said vehicle body 1, said rail 46 may be of mono-rail type wherein a vehicle body 1 formed for this purpose rides over a single rail member.

The operation control system for said amphibious traveling vehicle (hererinafter refered to operation control system) according to the invention is now described with reference to FIG. 12 to FIG. 20.

Figure 12:
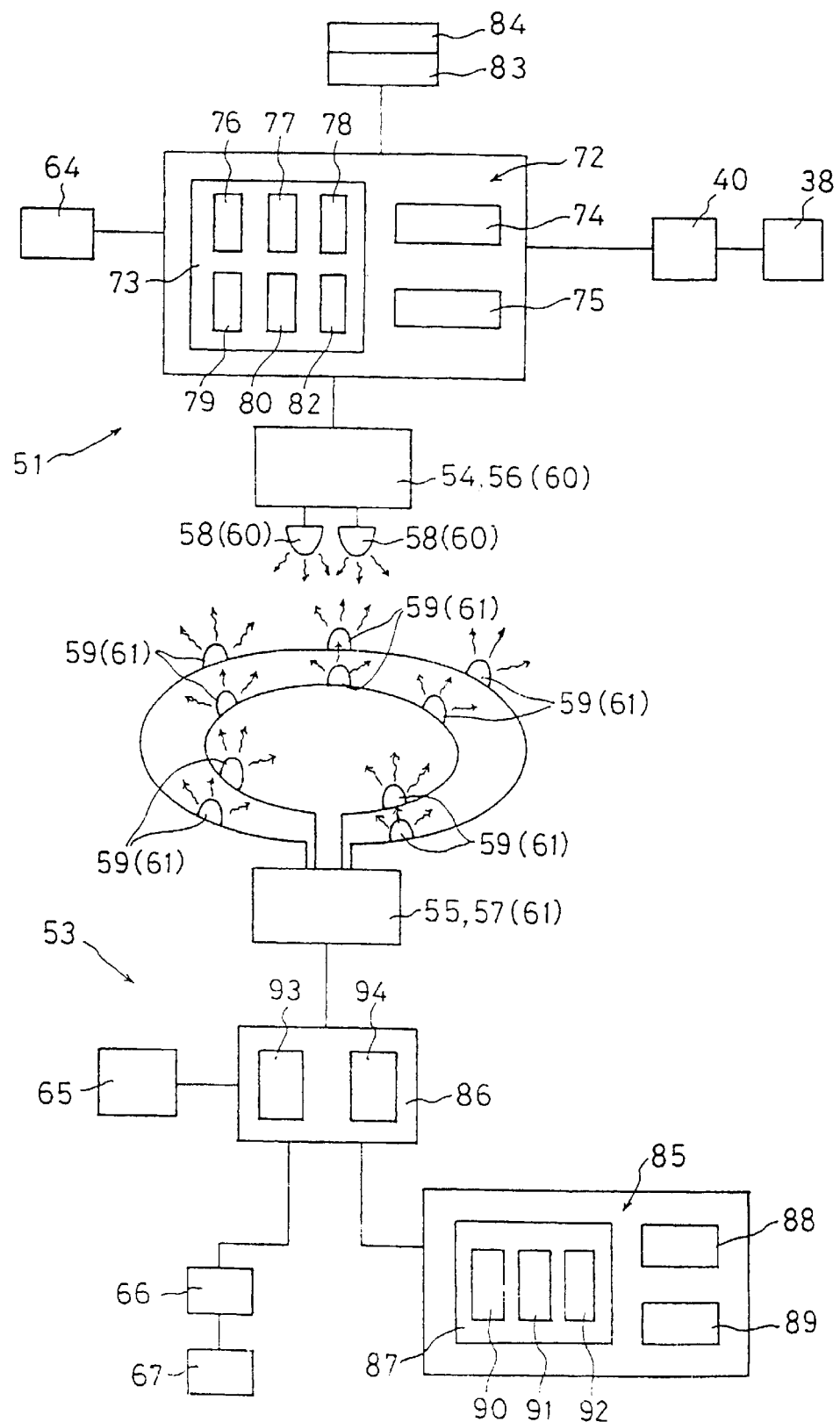
FIG. 12 is a schematic circuit diagram of an embodiment of operation control system of the traveling vehicle comprising information transferring system according to the present invention.

FIG. 12 shows a circuit diagram of said operation control system, which comprises said traveling vehicle-side control system 51 provided on the side of vehicle body 1 and a host-side control system 53 installed in a host-side station 52 consisting of a fixed station on the land or a moving station on ships and the like provided separately from said vehicle body 1. Said host-side station 52 is not limited to that on the land or on the water surface, but may be a fixed or moving station in the water 45 or in the air.

For information transmission by means of light beams, said both control systems 51, 53 comprise therein modulators 54,55 for modulating instruction information into light beams, demodulators 56, 57 for demodulating received light beams into instruction information, and corresponding means 60, 61 consisting of light beam transmitter/receiver 58, 59. Although light beams are used as transmitting medium in this example, radio communication may be used as transmitting medium in specific case as described below. However, said light beams can cover a further distance even in the water, so that they can transmit more information to further distant spot in comparison with radio communication. Said light beams include infrared beam, ultraviolet beam and visible light beam. Among these light beams, near infrared beam is most preferable due to the fact that this type of beam is not dangerous for human body and has a longer wave length than those of visible light beam and ultraviolet beam, so that it has a characteristic of detouring obstacles such as soil particles in the water 45. Further, among visible light beams, that of green-blue color system is preferable due to the fact that it passes comparatively readily through water 45. In the description below, near infrared beam is used as typical example of beams.

Light beam transmitter/receiver 59 of host-side communication means 61 is formed as a plurality of light shower fixed stations 59, 59. These light shower fixed stations are located along said travel rail 46 as respective pairs thereof for the purpose of transmission and receiving near infrared beam which is necessary for operation control including information of passing through of said vehicle body and near infrared beam for voice and images of passengers. Corresponding light shower movable stations 58, 58 as light beam transmitter/receiver 58 of communication means 60 are also provided on the side of vehicle body at proper positions such as front lower edge of said vehicle body. These light shower movable stations 58, 58 are provided on said vehicle body 1 as a pair for the purpose of detecting the location of said vehicle body by detecting that of said showering fixed stations 59, 59, and for the purpose of receiving and transferring respectively near infrared beam for controlling use as control instruction from the host-side or near infrared beam for voice and images from passengers or from the host-side. These near infrared beams for controlling use or for voice and images are branched from each other in order to transfer them separately. This is for obtaining a smooth information processing and for taking a more rapid corresponding actions in a case of emergency and the like. Of course, said near infrared beams for control use and for voice and images may form a single path in order to increase the processing capacity of control means 72.

Figure 13:
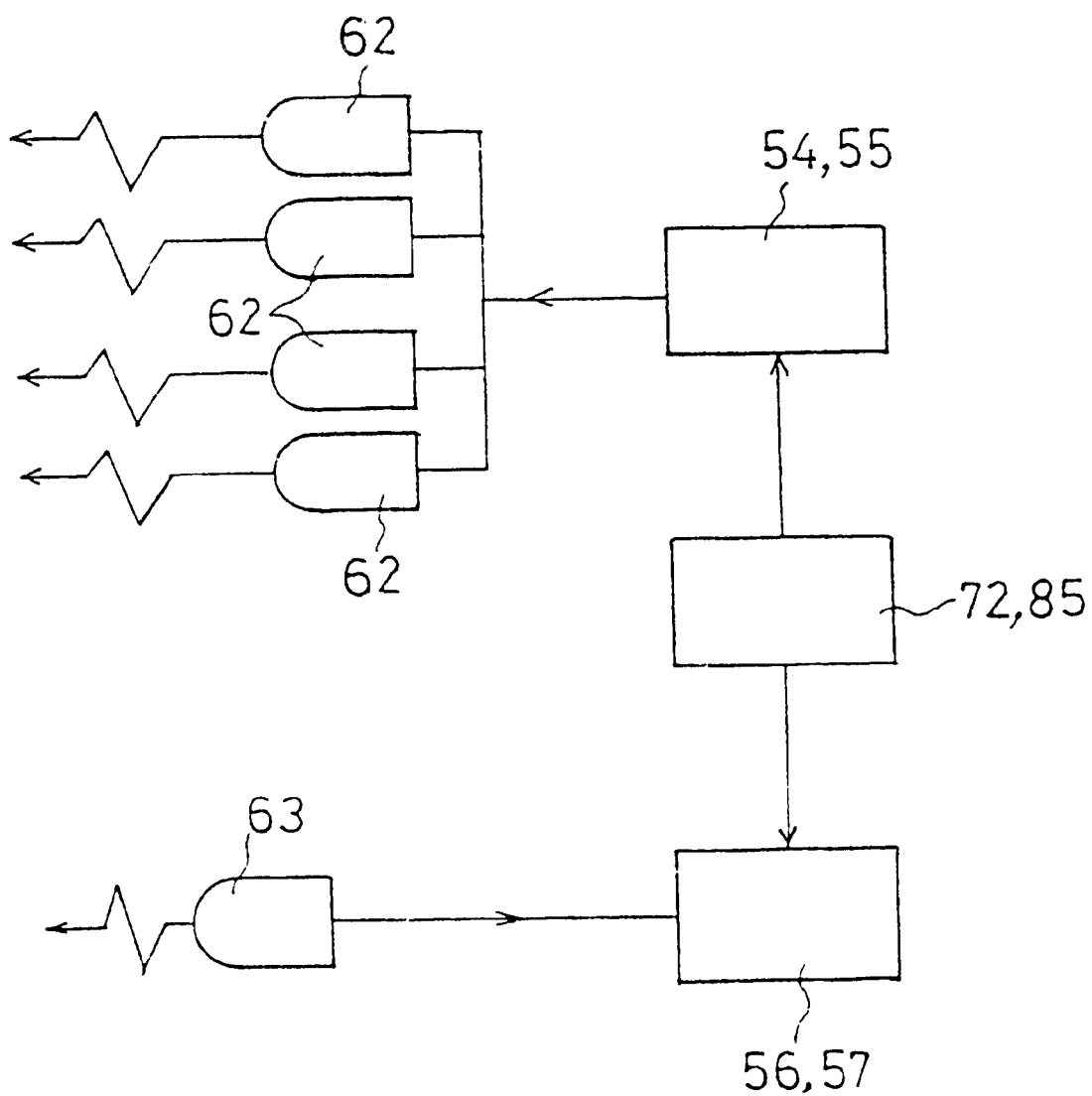
FIG. 13 is an explanatory view of a light beam shower fixed station and a light beam shower movable station in an embodiment of information transferring system according to the present invention.

Said light showering fixed stations 59, 59 and said light shower movable stations 58, 58 are formed respectively with light emitting diodes 62 and light receiving diode 63 as shown in FIG. 13. Said light emitting diodes 62 are located so as to emitting near infrared beam as a radiation, while on the other hand said light receiving diode 63 is formed so that it may receive at least one near infrared beam radiated from said light emitting diodes 62. Accordingly, said light showering fix stations 59, 59 and said light showering movable stations 58, 58 are respectively capable of bilateral transmission and reception. Further, said light emitting diodes 62 are constructed so as to receive instruction information from control means 72 of traveling vehicle-side control system 51 and from host-side control center 85 of said host-side control system 53, through said modulation circuit, and to emit said information as a near infrared beam having a predetermined information density. This information density (i.e. transmission rate) is determined depending upon the final object, for example, it is about 9600–19200 BPS for near infrared beam for control use or about 10 MBPS for near infrared beam for voice and images. Near infrared beam received by said light receiving diode 63 is demodulated through said demodulating circuit into a predetermined type of instruction information such as digital, analog and the like form to be transmitted to corresponding control means 72 and said host-side control center 85.

Voice and image outputting means 64, 65 are connected to respective communication means 60, 61, said outputting means 64, 65 having each such functions as voice telephone, television telephone and the like for the purpose of outputting voice and images. Said host-side communication means 61 can be connected also to public telephone circuit 67 such as NTT through ISDN circuit 66

Figure 14:
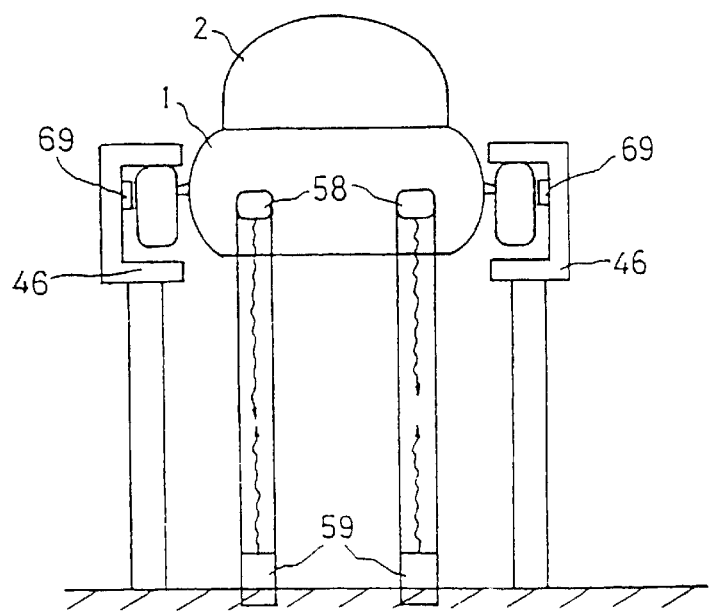
FIG. 14 is a front view showing the schematic construction of and embodiment of the information transferring system according to the present invention.
Figure 15:
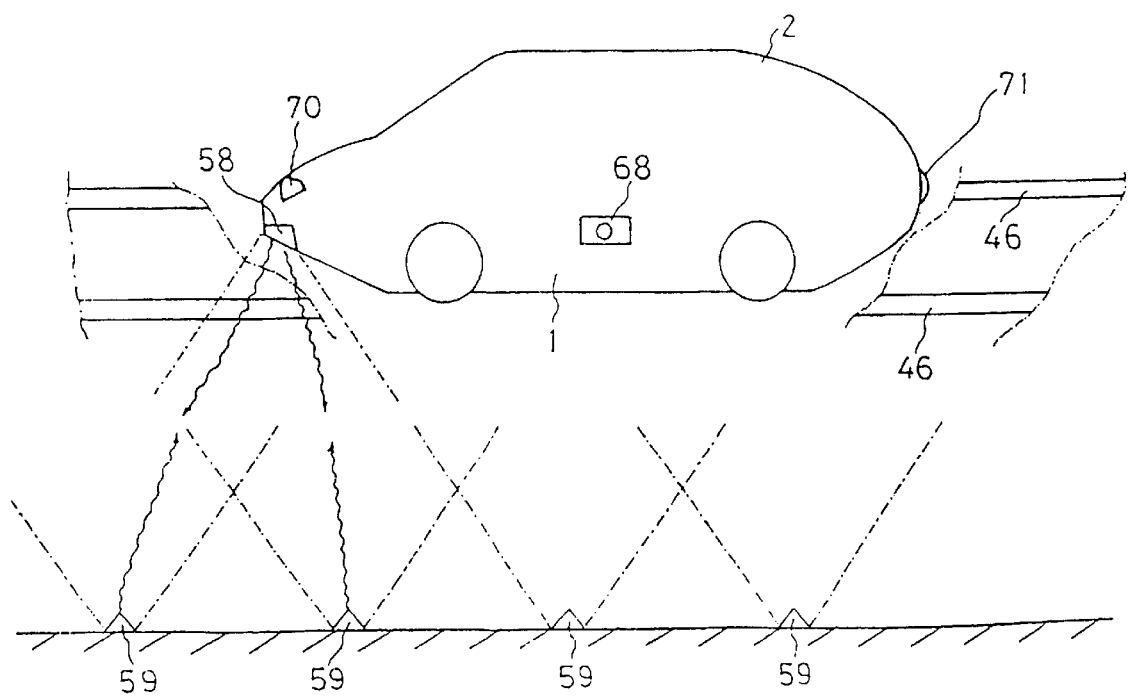
FIG. 15 is a side view of FIG. 14.

On the other hand, detection of situation of said amphibious traveling vehicle may be included in the near infrared information transmitted between said light shower fixed stations 59, 59 and said light shower movable stations 58, 58, but said situation of amphibious traveling vehicle may also be detected by means of detectors 68, 69 located between said vehicle body 1 and said travel rail 46 as shown in FIGS. 14 and 15. More specifically, a position detector 68 for generating near infrared beam is located on the side surface of said vehicle body 1, while on the other hand, position detecting reflecting boards 69 for reflecting said near infrared beam generated by said position detector 68 to this position detector 68 are provided in the inner side of said C-type member of said travel rail 46. Said near infrared beams read out by said position detector 68 is transmitted successively to a control means 72 and a host-side control center 85 as described later more in detail.

Further, a detector 70 for preventing bumping is provided on the front portion of said vehicle body 1, and a reflecting board 71 for bumping prevention is provided on the rear portion thereof, as shown in FIG. 15. For this purpose, said detector 70 for bumping prevention determines the time period needed for said near infrared beam generated therefrom, thereby to detect the distance from the preceding vehicle and to prevent the collision therewith through said controlling means 72 of said traveling vehicle-side control system 51.

Further as shown in FIG. 12, said control means 72 for controlling respective components of said vehicle body 1 and said vehicle capsule 2 thereof is connected to said communicating means 60 of said traveling vehicle-side control system 51, said control means 72 comprising a decision executing means 73, a monitoring system 74 and a storage means 75.

Said monitoring means 74 is constructed so as to permanently monitor the real state of components of said vehicle body 1 and said vehicle capsule 2 thereof by means of suitable sensors (not shown) and to output the detected data to said decision executing means 73. In this case, the monitoring articles comprise those included in the check list before starting, the check list in operation, the check list for light troubles, the check list for heavy troubles and the check list at the completion of traveling of vehicle body 1.

Said check list before starting includes such articles as for example, talking state between the inside of said traveling vehicle capsule 2 and said host-side station 52, closed state of said hatches 4, 5 and 6, wearing condition of seatbelts, voltage of said both batteries 39, 43, load torque of said driving motor 38, available electric current and voltage in said driving motor 38, oxygen density, carbon dioxide density, room temperature and room humidity in said capsule 2 of said traveling vehicle, operation state of air conditioner and the like.

Said check list in operation includes in addition to said articles of said check list before starting, such articles as for example, traveling speed, passing by predetermined spots, stopping and starting at predetermined places, flooding state, distances between vehicles and the like.

Said check list for light troubles includes the articles which can be processed by the controlling means of said amphibious traveling vehicle itself, such as for example, traveling speed, passing by predetermined spots, stopping operation at predetermined places, decrease of talking function, decrease of room air conditioning function and the like.

Said check list for heavy troubles includes the articles which can not be processed by the controlling means of said amphibious traveling vehicle itself, such as for example, stopping of driving motor 38, fire broken out in said vehicle capsule 2 and the like.

Said check list at the completion of traveling includes the articles such as for example, stopping of said amphibious traveling vehicle at predetermined place (mainly at the terminal station), circumstances in said vehicle capsule 2, closed state of both hatches 4, 5 and the like.

In storing means 75, various types of information are stored in RAM, ROM, CD-ROM and the like storing media. All the operational contents such as communication process with said host-side station, decision criteria and decision method of respective check lists, outputting process for driving motor 38 and other elements and the like are stored in said storing means 75.

As shown in FIG. 12, said decision executing means 73 consists of such elements as operation control section 76 for said vehicle position detecting and controlling section 77 for said vehicle, controlling section 78 for room circumstances, secret and safety keeping and controlling section 79, capsule leaving control section 80, voice and images controlling section 82 and the like. Said decision executing means 73 thus constructed decide respective check lists under the instruction from said host-side station 52 or under the decision of traveling side itself based on programs stored in said storing means 75, and the decisions thus made are output to said host-side station 52 through said communication means 610 and 61, while said decision executing means 73 outputs operational instructions to said driving motor 38 and other elements based upon said decisions under the instruction from said host-side station 52 or under the decision of traveling side itself based on programs stored in said storing means 75.

More specifically, said operation control section 76 for said vehicle has a function to operate following said operation control programs for said amphibious traveling vehicle stored in said storing means 75, and another function to correspond to instruction from said host-side station 52 and to operation control programs for simultaneously controlling a plurality of amphibious traveling vehicles.

Said vehicle position detecting and controlling section 77 has the function to transmit a position signal of traveling position from said amphibious vehicle body for said host-side station 52 to monitor a plurality of amphibious traveling vehicle.

Said controlling section 78 for room circumstances has a function to compare the monitoring results such as oxygen density, carbon dioxide density, room temperature and room humidity in said capsule 2 of said traveling vehicle, operation state of air conditioner and the like with the data stored in said storing means 75, thereby to make a decision and carry out a control for preparing a normal and convenient room space. Said controlling section 78 has further functions such as to control air conditioner, not shown, device for removing carbon dioxide, device for exhausting unnecessary air to outside and the like and also to correspond to environmental program instructions from said host-side station 52 based on indoor environmental data.

Said secret and safety keeping control section 79 has a function to detect signals concerning to monitoring results output from said monitoring means 74 such as talking condition between the inside of said traveling vehicle capsule 2 and said host-side station 52, closed condition of said hatches 4, 5 and 6, wearing condition of seat belts, flooding condition, whether or not to wear the oxygen masks, voltage state of both batteries 39, 43, load torque of said driving motor 38, current and voltage through said driving motor 38 and the like; and a function to trouble-reset signals when a normal conditions are detected thereby to enter into the following step.

Said capsule leaving control system 80 has a function to cause said capsule 2 to be separated from said vehicle body 1 in an emergency due to troubles such as abnormal conditions or fire in said capsule 2 and said vehicle body 1, with said capsule control system 80 being operable either in said vehicle body or in said host-side station 52. The removal of said capsule 2 by means of said capsule removing control section 80 is not necessarily limited to any emergency. For example, said capsule 2 can be controlled so that it may be removed from said vehicle body 1 to cause it to emerge on the water surface or to stop at predetermined position in water 45 for the purpose of allowing passengers to see an attraction in an amusement facility, and to return onto said vehicle body 1 for continuing travel.

Or otherwise, when said amphibious traveling vehicle is used in a traffic system or in a transportation system, said capsule 2 may be caused to emerge onto the surface of water together with passengers and baggage and to return to said traveling vehicle after unloading said passengers and baggage.

Otherwise, said vehicle body 1 may be used only for traveling in the water for seeing any attraction installed in the water 45, and said capsule 2 may be removed from said vehicle body 1 to emerge onto the water surface for passengers to go into or out from said capsule 2.

When removing said capsule, wires 26 having lengths of wire corresponding to using purpose are coupled to said capsule 2 thereby to limit its range of movement as shown in FIG. 8, while for returning said capsule 2 to said vehicle body 1, said wire 26 is rewound by means of said rotary pulley 24.

Figure 16:
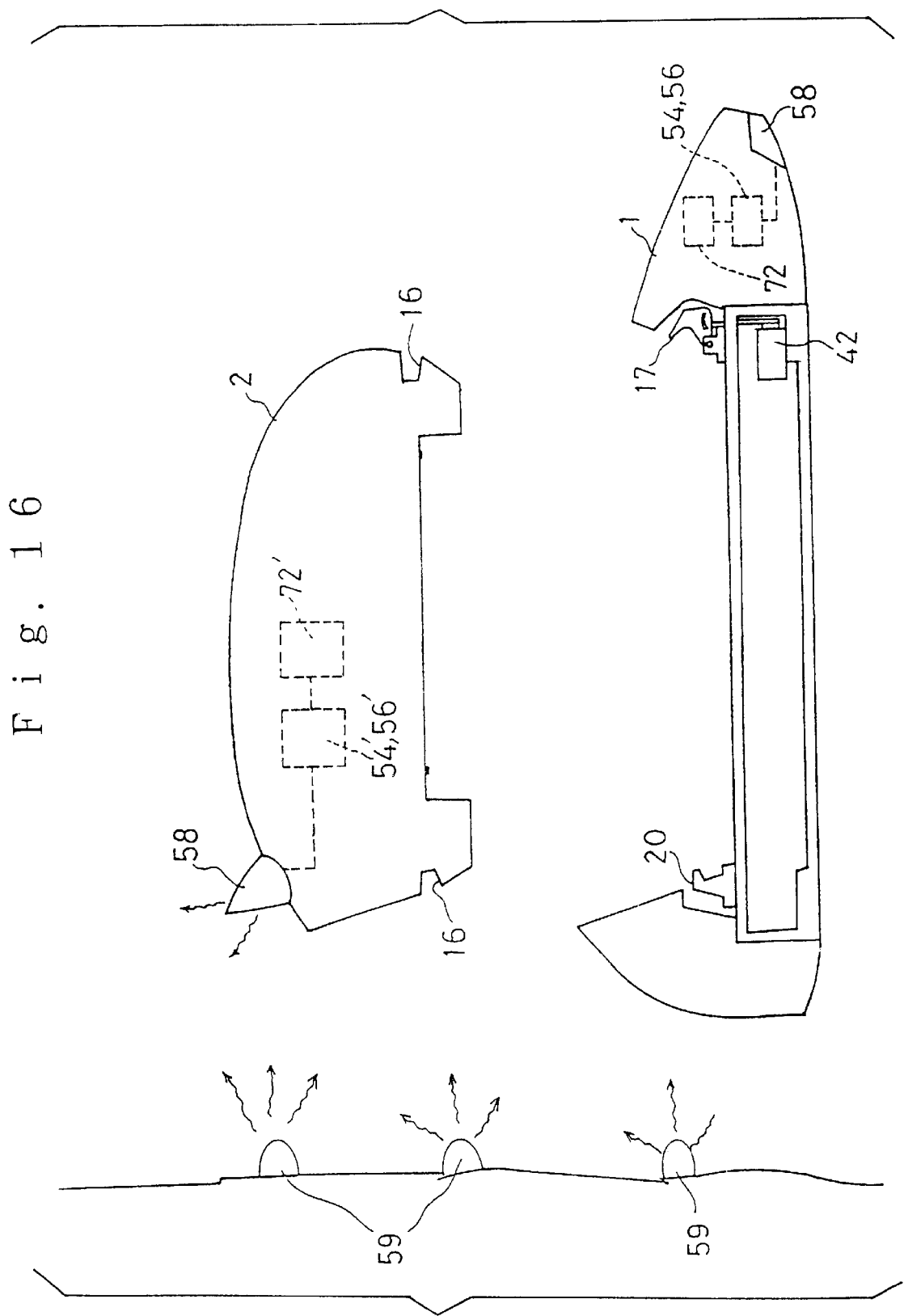
FIG. 16 is an explanatory view of another vehicle capsule removing state of a removing device.

However, removal of said capsule 2 is not limited to such wire means as described above. For example as shown in FIG. 16, said shower fixed station 59, 59 may be arranged with predetermined distance in the floating direction of said capsule 2, and said capsule 2 may be provided with modulator 54', demodulator 56' and light showing movable station 58 as independent communication means as well as a control means 72' for controlling respective elements of said capsule 2 based on the operational instruction from host-side control system 53, wherein information transmission between said host-side control system 53 and said capsule 2 may be carried out by means of near infrared beam. By means of such a means as described above, said capsule 2 can be freely removed from said vehicle body 1 with or without said wire 26 coupled thereto, and even when said wire 26 is cut or broken, said capsule 2 can be remote-controlled from said host-side station 52. Accordingly, when said light showering fixed stations 59, 59 are arranged within the scope of light information transmission/receiving in accordance with moving range of said capsule 2, it can be controlled in direction and range corresponding to use purpose without being limited to the track of said rail 46. In this case, said capsule 2 may be provided with its own operational means such as screws in order to make said capsule 2 freely movable in the water. Further, said capsule 2 may be provided with suitable and controllable wings (not shown) on its lateral side surfaces or in its rear portion for the purpose of stabilizing the position of said capsule 2 in the water or for obtaining a ready change of direction of said capsule 2.

As described above, said capsule 2 can be freely moved independently from said vehicle body 1 by providing on said capsule 2 said control means 72' similar to said control means 72 of said vehicle body 1. However, when said capsule 2 is engaged integrally with said vehicle body 1 by means of said fixed hook 20 and said movable hook 17, either one of said control means 72, 72' is selected automatically or by manual operation for controlling respective elements of said amphibious traveling vehicle.

Figure 17:
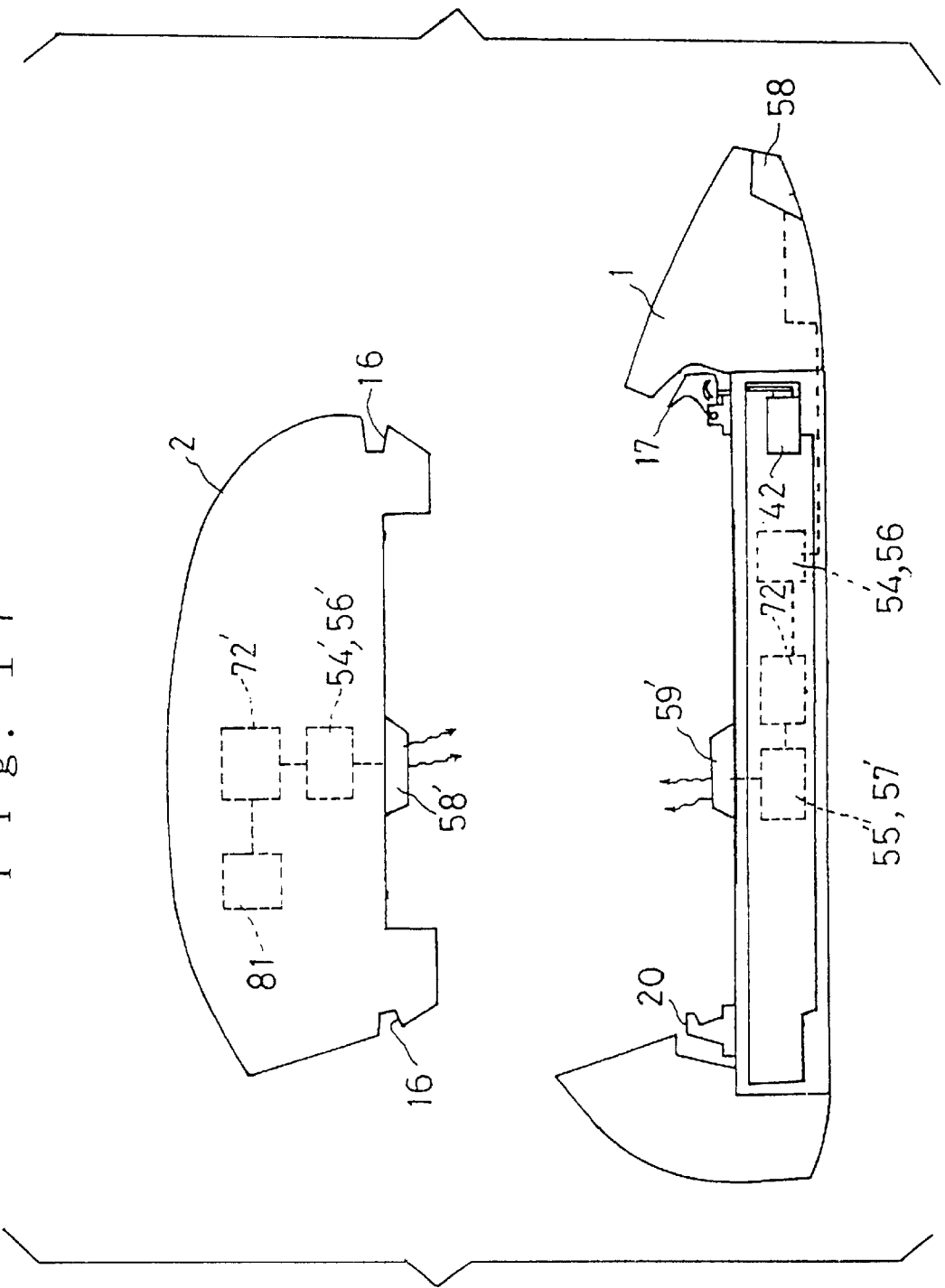
FIG. 17 is an explanatory view of still other capsule removing state of a removing device.

Further, the construction of removing said capsule 2 from said vehicle body 1 to cause said capsule 2 to move freely may comprise, as shown in FIG. 17, a light shower fixed station 59' as said host-side communication means 61' located on the upper surface of said vehicle body 1 and connected to said modulator/demodulator 55', 57', and a light shower movable station 58' as said movable station-side communication means 60' located on the under surface of said traveling capsule 2 and connected to said modulator/demodulator 54', 56'. In this construction, in addition to controlling of said respective elements, said control means 72 has a function to transmit from light shower fixed station 59' located on the upper surface of said body 1 to said capsule 2 by means of near infrared beam the operation instructions of said host-side control system 53 concerning to said traveling capsule 2 and received through said light shower fixed station 59 and said light shower movable station 58. In such a construction, it is possible to control the operation of said capsule 2 through said vehicle body 1 from said host-side control system 53.

Figure 18:
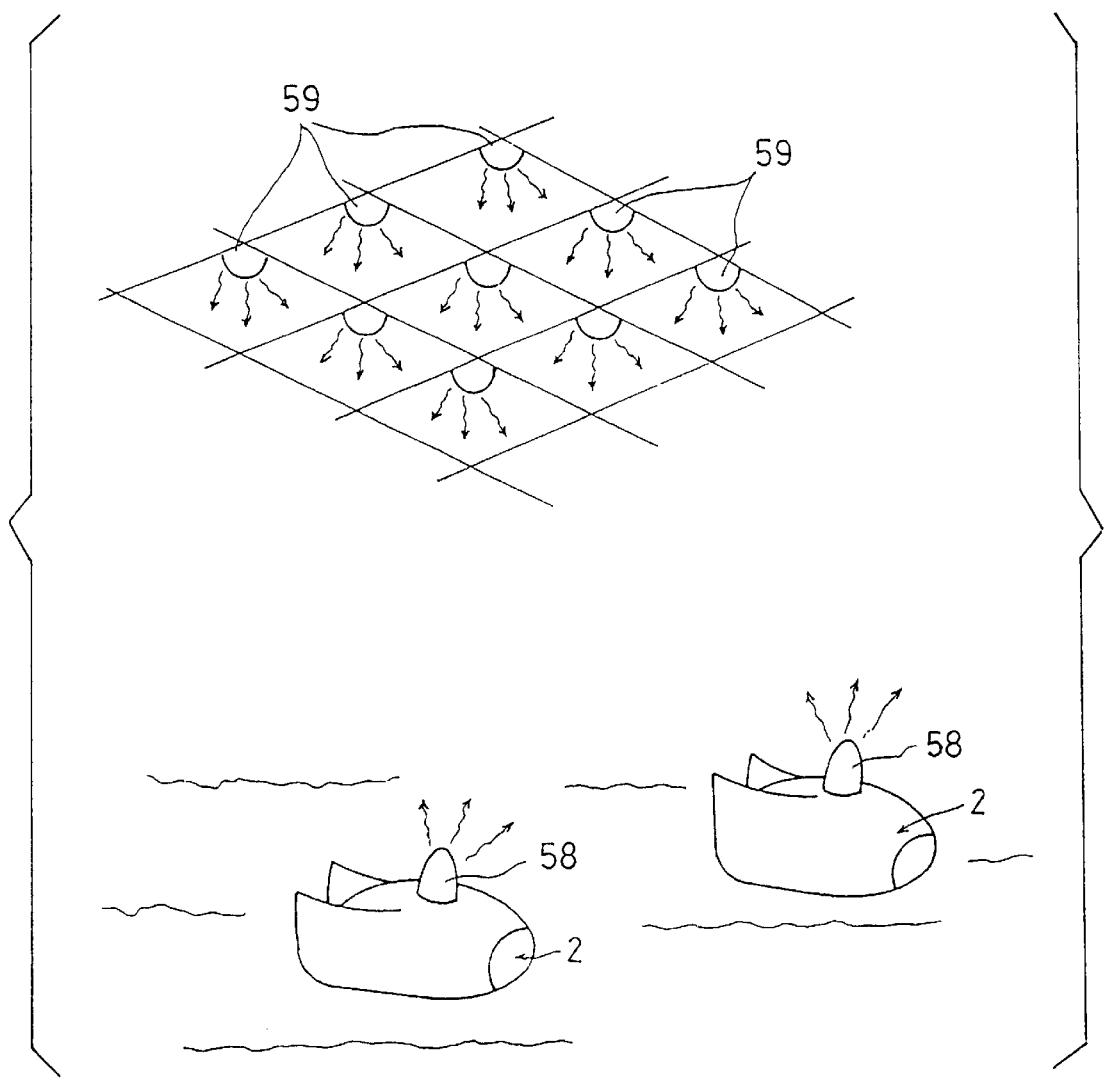
FIG. 18 is an explanatory view of a free traveling of said vehicle capsule.

Further, when said traveling capsule 2 is caused to travel on the water surface in a facility, said light shower movable station 58 is located on the upper surface of said capsule 2 while said light shower fixed station 59, 59 are located above said capsule 2 in the ceiling of said facility, as shown in FIG. 18. In such a construction, instruction information from said host-side control system 53 can be transmitted widely from above said capsule 2 thereby to more freely control the movement of said capsule 2.

Said voice and images control section 82 described above has a function to control and transmit voice and images of passengers on said amphibious traveling vehicle to said host-side station 52 in a real time manner, as well as another function to receive voice and images from host-side station 52 and to display images or make louder said voice through said output means 64. Display of images can be carried out in still images or in serial images.

An operation changing-over means 83 with an operation mode input means 84 such as lever or key board is connected to said control means 72 for changing over from an automatic operation state wherein operation instructions are automatically output to respective elements such as for example said driving motor 38 to a manual operation state wherein crew in said capsule 2 outputs operation instruction by manual operation, and vice visa.

In this embodiment, said vehicle-side control system 51 is located in said capsule 2 as a whole, with said control system 51 being able to cause respective elements to operate independently from said host-side station 52. This is for causing said amphibious traveling vehicle to move independently thereby to assure more safety even when communication between both control systems 51, 53 is interrupted by any reasons.

Further, a host-side control center 85 for transmitting operational instructions to said vehicle-side control system 51 is connected to said communication means 61 of said host-side control system 53 through an information unifying means 86. Said host-side control center 85 includes therein mainly a decision executing means 87, a storing means 88 and a means 89 for displaying the traveling state.

Said storing means 88 store therein various information at storing media such as RAM, ROM and CD-ROM, such as for example communication procedure with said vehicle-side control system 51, decision criteria and decision procedure of said respective check lists, operation instruction contents to respective elements such as driving motor 38 based on said decision criteria, and operational contents of said host-side control center 85.

Said decision executing means 87 comprises mainly an inner information control system 90, host-side voice and images control system 91 and outer information control system 92. Upon receiving various monitoring data from said monitoring means 74 of said vehicle-side control system 51, said decision executing means 87 carries out decision on said respective check lists based on the criteria stored in said storing means 88, and output operation instruction for various elements such as said driving motor 38 corresponding to the results of said decision to said vehicle-side control system 51 through said light shower fixed stations 59, 59 of said communication means 61. Decision results and instruction contents of said decision executing means 87 and information about monitoring results from said monitoring means 74 are transmitted to said traveling state display means 89 to be displayed therein as images and voice.

More in detail, said inner information control system 90 having the safe traveling of said amphibious traveling vehicle as its object has a function to output control instruction corresponding respective cases based upon traveling programs for a plurality of vehicles stored in said storing means 88 thereby to automatically control said vehicle. For this purpose, in addition to operation control of said vehicle, said inner information control system 90 outputs other control instructions corresponding to various circumstances based upon indoor circumstances of said capsule 2 and other various data through modulator 55 and near infrared transmitter/receiver 59, 59.

Said host-side voice and images control system 91 has a function to display voice and images of passengers in a plurality of said vehicles thereby to assure a bilateral talking.

Said outer information control system 92 has a function to process and control outer information which is independent from said amphibious traveling vehicle thereby to make it possible to carry out PC communication, telephone talking, television/radio receiving and the like with outer world even in said amphibious traveling vehicle.

Said information unifying means 86 is used for carrying out smoothly the information transmission between said amphibious traveling vehicle and said host-side control center 85. More specifically, since near infrared beam received by said near infrared beam transmitter/receiver 58, 59 includes therein noises in addition to effective information, said information unifying means 86 excludes such unnecessary information as noises, or otherwise analyzes or arranges various control information. Said unifying means 86 comprises control transmitting device 93 and voice and images transmitting device 94.

Said control transmitting device 93 is programmed so as to analyze and arrange such information input whereinto from a plurality of said amphibious traveling vehicle or transmission information for controlling a plurality of said amphibious traveling vehicle from said host-side station 52, and to output information arranged in a safe and effective order both to said amphibious traveling vehicle and said host-side station 52.

Said voice and images transmitting device 94 is programmed so as to analyze and store the voice an images information input from both said amphibious traveling vehicle and said host-side station 52, and to output information arranged both to said amphibious traveling vehicle and said host-side station 52.

As described above, information transmission system according to the embodiment of the present invention consists of said control means 72, said modulator 54, said demodulator 56 and said light beam transmitter/receiver 58, 58 on the side of said vehicle-side system 51, and said host-side control center 85, said modulator 55, said demodulator 57, said beam transmitter/receiver 59, 59 and said information unifying means 86 on the side of host-side control system 53.

Further, information transmitting system using light beam as transmission medium is adopted in the operation control system of said amphibious traveling vehicle according to this embodiment of the present invention, as described above. However, said operation control system is not limited to light beam, but may use radio means as information transmission medium.

Figure 19:
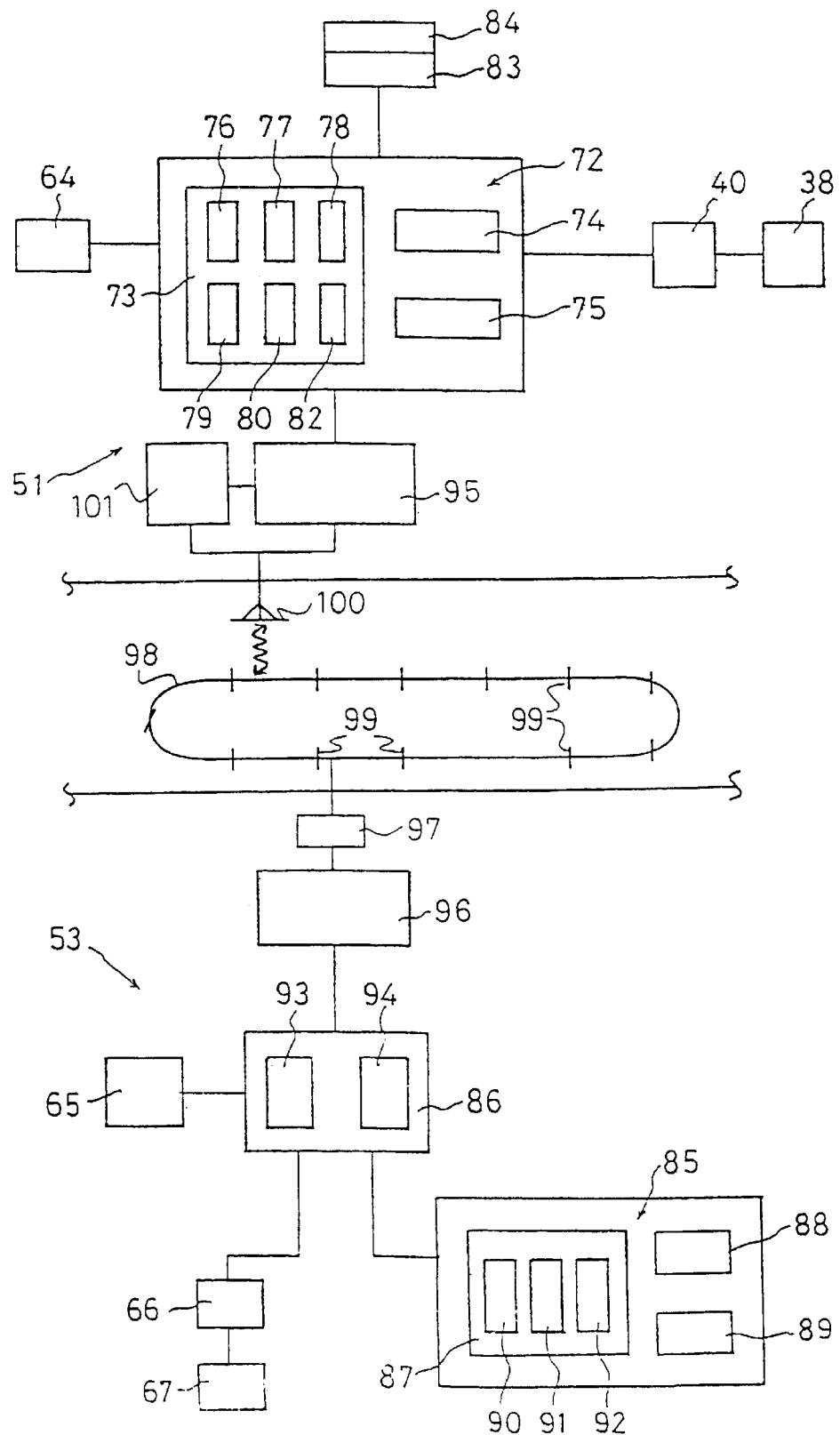
FIG. 19 is a schematic circuit diagram of an embodiment of operation control system comprising information transferring system according to the present invention which is different from that shown in FIG. 12.

More specifically, as shown in FIG. 19, said vehicle-side control system 51 and said host-side control system 53 are provided respectively with communication means 95 and 96 consisting respectively of transmitter/receiver for the purpose of transmitting information through radio LAN. An antenna 98 consisting of leakage coaxial cable is connected to said host-side communication means 96 through an adapter 97. A plurality of tags 99 for detecting passing of said vehicle is connected with a predetermined distance to the predetermined spots of said antenna 98. Another antenna 100 is connected to said communicating means 95 on the side of said vehicle. A tag reading-out means 101 is connected to said antenna. 100 for the purpose of detecting the presence of said tags 99 thereby to detect the position of said vehicle.

Just as in said information transmission system using beams as transmission medium, said communication means 95 of said vehicle-side control system 51 has connected thereto a control means 72 for controlling respective elements in said vehicle 1 and said capsule 2, and said control means 72 includes therein said decision executing means 73, said monitoring means 74 and said storing means 75. Said communication means 96 in said host-side control system 53 has connected thereto through said information unifying means 86 said host-side control center 85 for outputting operation instructions to said vehicle-side control system 51. This host-side control center 85 includes said decision executing means 87, said storing means 88 and said traveling state displaying means 89.

Further, both said light shower movable station 58 for transmitting/receiving near infrared beam to or from said vehicle body 1 or vehicle capsule 2 and said antenna 100 for transmitting/receiving said radio LAN may be connected to said control means 72, thereby to make up a construction which can receive either through near infrared beam or through radio LAN. In this case, when said vehicle 2 floats up to the water surface, either near infrared beam from said host station 85 or radio LAN is selected for transmitting instruction information, thereby to cause said capsule 2 to freely travel independently from said vehicle body 1. By using such a construction as above, a transmission method which is more adaptable to propagate control signals in the circumstance on the water surface, i.e. either near infrared transmission or radio LAN, can be selected, thereby to more reliably control the operation of said vehicle capsule 2. Further, such an information transmission is not limited to said vehicle capsule 2 moving on the water surface, but can be applied to amphibious traveling vehicle traveling on the land or in the water.

The operation mode of the embodiment of the present invention is now described with reference to FIG. 20.

Further, information transmission system may use either light beam or radio LAN as transmission medium, as described above. However, these two types of operation control system is different from each other with respect to a part of communication means, but they do not have essentially different principles. Under these conditions, near infrared beam which is a light beam is described hereunder as information transmitting medium.

Figure 20:
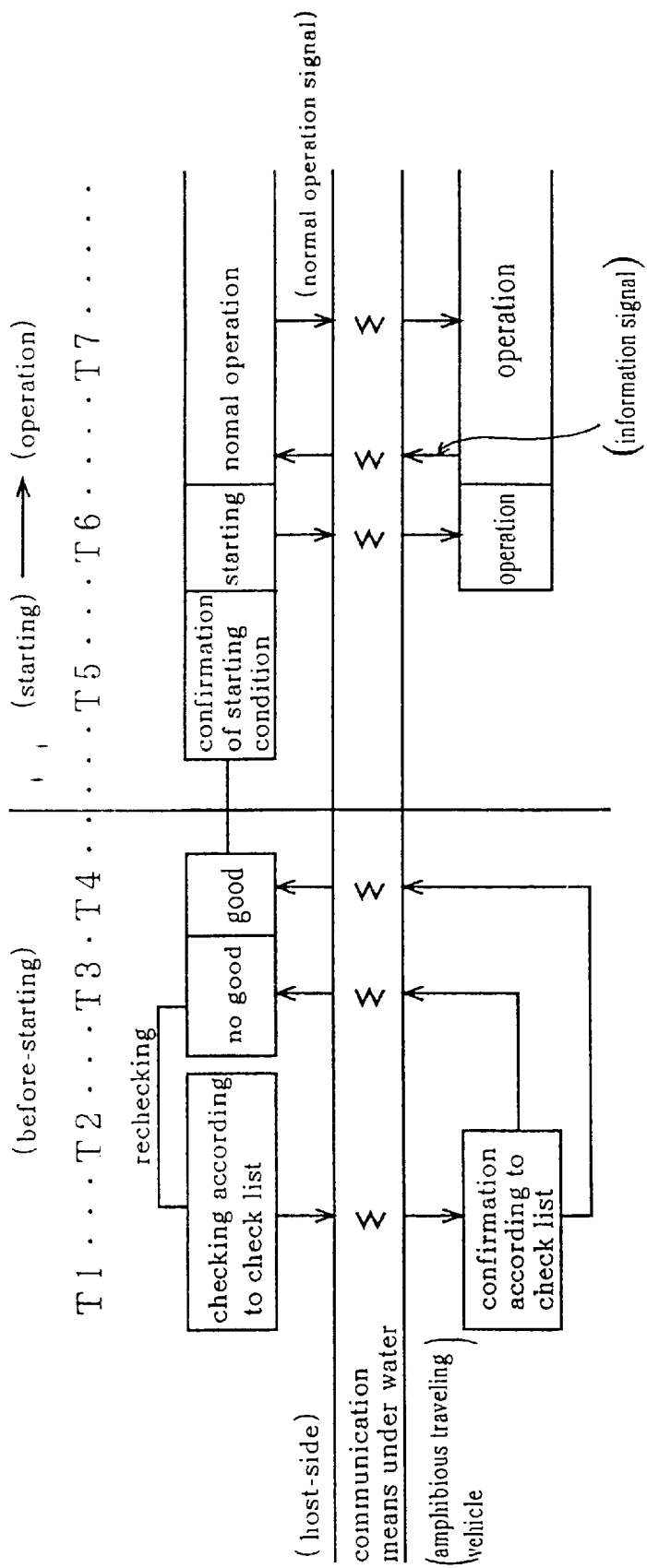
FIG. 20 is a time chart showing the operation control using the operation control system of said traveling vehicle according to the present invention.

PERIOD BEFORE STARTING OF TRAVELING VEHICLE (Left Side of FIG. 20(*a*))

In this embodiment, said vehicle body 1 is first located on the land, and outer hatches 5, 6 of said vehicle body 1 and said vehicle capsule 2 are opened. After crew and passengers have entered into said vehicle, said inner hatch 4 is closed with simultaneous closing of said outer hatches 5, 6, so that the inner side space of said cabin 3 is air-tightly closed. In this case, although not shown, an oxygen generating apparatus feeds a suitable quantity of oxygen in the inner space of said cabin 3, while an carbon dioxide removing apparatus is used for removing carbon dioxide which is generated in said cabin 3.

Thereafter, checking following said check list before starting is carried out.

At time T1 of FIG. 20(*a*), said host-side control system 53 of said host-side station 52 is started, so that said decision executing means 87 of said host-side control center 85 outputs a staring instruction for said before-starting check list following the programs stored in said storing means 88. Said starting instruction is modulated through said modulator 55 as communication means 61 after passing through said information unifying means 86, thereby to be transmitted as near infrared information from said light shower fixed station 59, 59. When this near infrared information is received by said light shower movable station 58, 58, it is demodulated through said demodulator 56 into control instructions corresponding to respective objects, and is input into said decision executing means 73 of said control means 72. Said decision executing means 73 receives said starting instruction of said before-starting check list, thereby to instruct said supervising means 74 to detect respective data contained in said before-starting check list following programs stored in said storing means 75. Said supervising means 74 detects respective data such as for example, talking conditions between the inner space of said capsule 2 and said host-side station 52, closing conditions of hatches 4, 5 and 6, wearing conditions of seat belts, voltages of both batteries 39, 43, load torque of said driving motor 38, electric current and voltage through said driving motor 38, oxygen density, carbon dioxide density, temperature and humidity within capsule 2, running state of air conditioners for the purpose of deciding the suitability of said data. At time T2 of FIG. 20(*a*), these detecting results are transmitted in a reverse course, i.e. from said modulator 54 and said light beam transmitter/receiver 58, 58 as communication means 60 on the side of said vehicle, to said light beam transmitter/receiver 59, 59 and said demodulator 57 as communication means 61 on the host-side, thereby to be input into said decision executing means 87 of said host-side control center 85 and to be compared with said criteria stored in said storing means 88 for deciding the suitability of data contained in respective check lists. Rechecking is carried out until all the data of check list become suitable (time T3), and when all the data become suitable, checking before starting is completed (time T4). These data detected from said check lists and their decision results are displayed in real time base in said traveling state displaying means 89 on the host side and in said voice and image outputting means 64 on the vehicle side.

STARTING OF VEHICLE AND ITS OPERATION (Right Side of FIG. 20(*a*))

When checking before starting is completed, confirmation of starting conditions is carried out by said host-side decision executing means 87 at time T5, and when a starling instruction is transferred at time T6, this instruction is transferred to the vehicle side as near infrared information by said communication means 60, 61. Said instruction is output to respective vehicle-side elements such as said driving motor 38, thereby to start the operation of said vehicle.

More specifically, the operation of said driving control device 40 is carried out by an instruction from said vehicle operation control section 76 of said decision executing means 73 thereby to drive and control said driving motor 38. Said front driving shaft 28 and said rear driving shaft 29 are driven in rotation by said rotational driving of said driving motor 38 respectively through said bevel gear box 37, said gear box 36, center differential gear 34, said front differential gear 30 and said rear differential gear 32, thereby to drive said respective main tires 12 and to cause said vehicle body 1 to travel along said rail 46.

In this case, said main tire 12 is applied on the inside bottom surface of said rail 46 due to the gravity applied on said vehicle body 1 on the land 44 as shown in FIG. 11(*a*), so that said vehicle is moved along said rail 46 due to rotational driving of said main tire 12.

When said vehicle body 1 is submerged in the water 45 while moving along said rail 46, the inner space of said vehicle body 1 is flooded with water through said water inlet and outlet. Then, due to buoyancy of said vehicle body 1 and that of the inside air contained in said cabin 3, said body 1 floats upwards in the inner portion of said rail 46, so that said main tire 12 is separated from the inner bottom surface of said rail 46 thereby to be applied onto the inner upper surface of said rail 46 as shown in FIG. 11(*b*). In this case, said auxiliary tires 13 in contact with said main tires 12 rotate in the reverse direction with respect to said main tires 12, so that with the same rotational direction of said main tires 12, said auxiliary tires 13 drive said vehicle body 1 in the water along the inner upper surface of said rail 46. Further, said auxiliary tires 13 may be driven independently from said main tires 12.

When the operation of said vehicle is started as described above, an instruction of normal operation is issued from said host-side decision executing means 87 at time T7, so that said vehicle body-side decision executing means 73 carries out a continuous checking of respective articles of said in-operation check list. More specifically, said decision executing means 73 receives the instructions of said in-operation check list through said light beam transmitter/ receiver 58, 58 as near infrared beam signals from said light beam transmitter/receiver 59, 59. After demodulating said instructions by means of said demodulator 56, said supervising means 74 is instructed to detect respective data contained in said in-operation check list while following programs stored in said storing means 75. In addition to the items contained in said check list before starting, said in-operation check list includes the suitability of such operation conditions as traveling speed, passing through the predetermined spots, stopping and starting at said predetermined spots and wagon distances. In this embodiment, detection of said "passing through the predetermined spots" and said "stopping and starting at the predetermined spots" is carried out by said position detector 68 and said position detecting reflecting board 69 or by said light beam shower fixed stations 59, 59 and said light beam shower movable stations 58, 58. Detection of said "wagon distances" is carried out by said detector for bumping prevention 70 and said reflecting board 71 for bumping prevention. The results of these detections are transferred from said communication means 60 on the side of vehicle to said communication means 61 on the host side through near infrared beam just as said checking results before starting, thereby to be input into said decision executing means 87 of said host-side control center 85 and to be compared with the criteria stored in said storing means 88 for deciding suitability of items contained in respective check lists. In a normal condition wherein all the check lists are suitable, an instruction is output for continuing operation as such, thereby to continue operation and in-operation checking. These data detected from said check lists and their decision results are displayed in real time base in said traveling state displaying means 89 on the host side and in said voice and image outputting means 64 on the vehicle side. Further, crew and passengers can communicate with outer world by means of television telephone through said voice and images outputting means 64, 65 or through public telephone circuit 67 such as NTT through ISDN circuit 66. Or otherwise, various information transmission can be carried out from the vehicle side to other public known information transmitting system provided on the host side.

OCCURRENCE OF LIGHT TROUBLES IN OPERATION (Left Side of FIG. 20(*b*))

When a light troubles occur at time T8 while continuing operation and in-operation checking, variations of checking items are detected by said supervising means 74 of said control means 72 on the vehicle side. Light troubles concerning to traveling speed, passing through the predetermined spots, stopping at the, predetermined spots, decrease of talking function, decrease of indoor air conditioning and the like are detected, and the detection results are output through near infrared beam to said host-side control center 85 just as described above. The degree of said variations are compared with the criteria stored in said both storing means 75, 88 at said decision executing means 73, 87 of said both control systems 51, 53. In the case of such light troubles, since degree of these variations can be corresponded by the control function of said traveling vehicle itself, said secret and safety keeping control section 79 of said vehicle-side decision executing means 73 decides to correspond thereto on the vehicle side itself and to output instructions to said driving motor 38 and the like so as to increase the faculty of respective items having decreased operation concerning to said light troubles. On the other hand, said decision executing means 87 on host side decides also the light troubles thereby to output the instruction of trouble resetting to said vehicle side at time T9. By these procedures, the state of light troubles is recovered to return again to the normal operation state. Detection data and their decision results are displayed on a real time base by respective images or voice at said traveling state displaying means 89 on the host side and at said voice and image outputting means 64 on the vehicle side.

OCCURRENCE OF HEAVY TROUBLES IN OPERATION (Right Side of FIG. 20(*b*))

In the case where operation and in-operation check are continued, when heavy troubles occur at time T10, said supervising means 74 of said vehicle-side control means 72 detects the variation of checking items. These heavy troubles can not be corresponded by the control faculty of said vehicle itself, and include for example stopping of driving motor 38 and fire broken out in said capsule 2. These states are detected, and the detection results are immediately output through near infrared beam to said host-side control center 85 just as described above. The degree of said variations are compared with the criteria stored in said both storing means 75, 88 at said decision executing means 73, 87 of said both control systems 51, 53. In the case of such heavy troubles, since degree of these variations can not be corresponded by the control function of said traveling vehicle itself, escape control section of said decision executing means 73 on the vehicle side outputs an instruction of emergency escape, while at the same time, said equipment control section 90 of said host-side decision executing means 87 decides the heavy troubles, thereby to output the request of dispatching of emergency boats. When any heavy troubles occur during the traveling of said vehicle body 1 in the water, remote control is changed into the manual operation state by means of said operation change-over device 83, and crew on board operates said operation mode input means 84 such as emergency escape button (not shown), thereby to operate said actuator 42 and to oscillate said movable hook 17 for disengaging it from said engaging slot 16. In this case, the front portion of said capsule 2 is inclined and raised up due to the buoyancy of said capsule 2. The inclination of said capsule 2 causes also said fixed hook 20 to be disengaged from said corresponding engaging slot 16, thereby to remove said capsule 2 from said vehicle body 1. In this case, said capsule 2 is coupled to said vehicle body 1 by means of said wire 26. When a tension is applied to said wire 26 owing to the floating up of said capsule 2, said wire 26 is drawn off thereby to rotate said rotary pulley 24. Consequently, said fluid fins 221 are caused to rotate, and the resistance against this rotation of fins 22 in the water limits the drawing-out speed of said wire 26, thereby to limit also the floating-up speed of said capsule 2. As a result, said capsule 2 containing therein crew and passengers can be floated up safely with a suitable speed without any impacts against crew and passengers. Said capsule 2 floating on the water surface waits for its rescue. In this case, if said capsule 2 and said vehicle body 1 are beforehand connected with each other by means of electric wire in addition to said wire 26, control of said communication means 60 and said oxygen supplying means can be continued in this rescue waiting state. Of course, it is possible to communicate with outer world by connecting with outer telephone circuit 67 through said ISDN circuit 66 for requesting rescue. Further, when a self traveling device such as simple screw device is mounted on said capsule 2, this capsule 2 can break said wire 26 after floating up onto the water surface for traveling itself by means of its self-traveling device up to the land. Further, it is possible to provide retractable wings so as to be expanded during the floating-up of said capsule 2 thereby to control the floating-up speed. Further, it may be possible to arrange light beam shower fixed stations 59, 59 in a random order and also to locate light shower movable stations 58, 58 and control means 72 on said capsule 2 itself, thereby to freely control and guide to a safe position said capsule 2 by said host-side control system 53. Detection data and their decision results are displayed on a real time base by respective images or voice at said traveling state displaying means 89 on the host side and at said voice and image outputting means 64 on the vehicle side.

COMPLETION OF OPERATION
(Right Side of FIG. 20(*b*))

When operation is continued without any heavy troubles, said vehicle body 1 approaches the terminal station and moves into the air along traveling rail 46 thereby to loose its buoyancy and to receive gravity directly, so that said vehicle body 1 is caused to descend with its main tires 12 applied onto the inner bottom surface of said rail 46, thereby to be moved along said rail 46 due to the rotational driving of said main tires 12. At time T11, said decision executing means 87 of said host-side control center 85 outputs a terminal stopping signal to the host side by near infrared beam through said light beam transmitter/receiver 58, 59. Upon receiving said signal, said decision executing means 73 of said vehicle-side control means 72 outputs a stopping order to the driving system such as said driving motor 38, thereby to cause stopping of said vehicle body 1 at the predetermined position. After checking the normal state inside of said cabin 3 in said capsule 2, said inner hatch 4 and said outer hatches 5, 6 are completely opened thereby to let screw and passengers descend from said vehicle body 1. Thus, operation of the vehicle is completed at time T 12. Thereafter, said vehicle body 1 is moved to a starting point for preparing the following boarding and starting.

As described above, the embodiment of the present invention provides an amphibious traveling vehicle which can be moved reliably and safely from on the land into the water 45 along said traveling rail 46 or in the water 45 after said rail 46 irrespective of weather and other bad conditions. Further, the embodiment of the present invention provides a system and method for transmitting information for amphibious traveling vehicle and system for controlling operation of the vehicle such as said vehicle can be operated suitably with a higher safety so as to cause crew and passengers to escape reliably even in the case of troubles in the water, with information transmission carried out in a same procedure whether in the water or in the air.

While the present invention has be described with reference to the exemplary embodiments thereof, it will be appreciated by those skilled in the art that variations and modifications may be made thereto if necessary without departing from the spirit of the inventive concepts disclosed herein. For example, the method of information transmission is not limited to near infrared beam describe in the above example, but other suitable means can be used. Further, other type of information transmission means may be used together therewith according to the degree of turbidity in the water 45.

Further said air in which said vehicle moves is to include also the atmosphere of specific condition such as for example atmosphere of carbon dioxide.

Further, said vehicle has been described above with reference to the case where said vehicle moves in the air and in the water 45 with human being mounted therein. However, said vehicle can be utilized in the case of movement without human being and cargoes mounted therein such as for example investigation in nuclear reactors.

POSSIBILITY OF INDUSTRIAL USES

As described above, the system and method for transmitting information for amphibious traveling vehicle and system for controlling operation of the vehicle can cause said vehicle to reliably and safely move from on the land into the water or in the water irrespective of weather, so that said vehicle can be used for example as a circulating and transporting means of passengers or cargoes between main island and isolated island, or can be applied to investigation of under-water installations such as the electric wire for telephone or the pipe lines for petroleum. Further, said vehicle may be utilized as the vehicles utilized in amusement parks or pleasure parks or for inspection in the water in the installation such as aquarium. Further, said vehicle may be utilized as toys moving in the waters such as indoor water tanks or outdoor ponds for information transmitting thereto and operation control thereof.

What is claimed is:

1. System for transmitting information of amphibious traveling vehicle comprising a traveling vehicle-side control system which controls the operating state of traveling vehicle and is provided on the traveling vehicle for traveling under water and in the air, a host-side control system which instructs the vehicle-side control system to operate the traveling vehicle and is provided separately from the traveling vehicle, and communication means which transmits information between the host-side and vehicle-side control systems and are connected to the systems, said system for transmitting information being characterized in that said communication means are constituted of modulators which modulate received instruction information into light beams, demodulators which demodulate received beams of light into the instruction information and a light beam transmitter/receiver, wherein the information transmission between the host-side and vehicle-side control can be performed with light beams including near infrared beam or visible light beam of green-blue color system, a traveling rail is laid in the water or from on the land into the water, said amphibious traveling vehicle is movably mounted on said rail, said light beam transmitter/receivers of said host-side control system are arranged along said traveling rail so as to carry out transmission to and reception from said respective light beam transmitter/receivers of said vehicle-side control systems of said amphibious traveling vehicles; and said amphibious traveling vehicle is constructed from a vehicle body moving along said traveling rail and a vehicle capsule mounted detachably on the upper side of said vehicle body, and said vehicle body and said vehicle capsule are respectively provided with said communication means and said control means of said vehicle side control system, wherein said light beam transmitter/receivers of said host-side control system are arranged in positions where they can car out a bilateral transmission/reception with said light beam transmitter/receiver of said vehicle capsule.

2. System for transmitting information of amphibious traveling vehicle as set forth in claim 1, which is characterized in that said light beam transmitter/receiver on said vehicle-side control system comprises a light shower movable station which generates light beams, while said light beam transmitter/receiver on said host-side control system comprises a light shower fixed station which generates lift beams.

3. System for transmitting information of amphibious traveling vehicle according to claim 1 or claim 2 is characterized in that said communication means of said vehicle-side control system has connected thereto control means for controlling the operation of respective elements mounted on said traveling vehicle, while said communication means of said host-side control system has connected thereto a host-side control center for outputting operation instructions to said vehicle-side control system.

4. System for transmitting information of amphibious traveling vehicle claimed in claim 3, which is characterized in that said control means of said vehicle control system comprises decision executing means, supervising means and storing means, wherein said supervising means is formed so as to permanently supervise actual states of respective elements mounted on said amphibious traveling vehicle and to output obtained data to said decision executing means, wherein said storing means stores therein operation contents of said control means, said operation contents selected from the group consisting of communication method with said host-side control system, decision criteria and decision method of respective check lists and operation contents of said control means such as outputting method to said elements, while said decision executing means decides said respective check lists in the case of receiving instructions from said host-side control system or depending on the independent decision of vehicle side based upon programs contained in said storing means, thereby to output the decision results to said host-side control system through said communication means and to output operation instructions to said respective elements corresponding to said decision contents when receiving said operation instructions from said host-side control system or depending on the independent decision of vehicle side based upon programs contained in said storing means; and/or in that said host-side control center comprises a decision executing means, a storing means and a traveling state displaying means, wherein said storing means stores therein such operation contents of said control means as communication method with said vehicle-side control system, decision criteria and decision method of respective check lists, contents of operation instructions to respective elements based on the obtained decision results and operation contents of said control means, while said decision executing means decides said respective check lists when received instructions from said host-side control system, based upon programs contained in said storing means, thereby to output operation instructions to said respective elements corresponding to said decision results; while said traveling state displaying means displays by means of voice and images the information about decision results and instruction contents of said decision executing means and about supervising results obtained by said supervising means.

5. System for transmitting information of amphibious traveling vehicle according to claim 4 which is characterized in that said host-side control center has connected thereto an information unifying means for analyzing, arranging and storing various input/output information.

6. System for transmitting information of amphibious traveling vehicle claimed in any one of claims 1 or 2, which is characterized in that a radio LAN transmitter/receivers is connected to said vehicle-side control system, wherein transmission of instruction information from said host-side control system in the case of said amphibious traveling vehicle traveling on the land and on the water surface is carried out by means of a radio LAN.

7. System for transmitting information of amphibious traveling vehicle comprising a traveling vehicle-side control system which controls the operating state of the traveling vehicle and is provided on the traveling vehicle for traveling under water and in the air, a host-side control system which instructs the vehicle-side control system to operate the traveling vehicle and is provided separately from the traveling vehicle, and communication means which transmits information between the host-side and vehicle-side control systems and are connected to the systems, said system for transmitting information being characterized in that said communication means are constituted of modulators which modulate received instruction information into light beams, demodulators which demodulate received beams of light into the instruction information and a light beam transmitter/receiver, wherein the information transmission between the host-side and vehicle-side control systems can be performed with light beams including near infrared beam or visible light beam of green-blue color system, a traveling rail is laid in the water or from on the land into the water, said amphibious traveling vehicle is movably mounted on said rail, said light beam transmitter/receivers of said host-side control system are arranged along said traveling rail so as to carry out transmission to and reception from said respective light beam transmitter/receivers of said vehicle-side control systems of said amphibious traveling vehicles; and said amphibious traveling vehicle is constructed from a vehicle body moving along said traveling rail and a vehicle capsule mounted detachably on an upper side of said vehicle body, and said vehicle body and said vehicle capsule are each provided with said communication means and said control means of said vehicle side control system, and said vehicle body is provided with control means and communication means for transmitting by light beams the operation instruction information transmitted from said host-side control system from said vehicle body to said vehicle capsule when said vehicle capsule has been detached from said vehicle body.

8. Operation control system of amphibious traveling vehicle wherein a traveling rail is laid in the water or from on the land into the water, said amphibious traveling vehicle comprising a vehicle body and a vehicle capsule separating provided on said vehicle body is movably mounted on said rail, and vehicle is provided with an emergency escaping device for separating said vehicle capsule from said vehicle body in an emergency, said operation control system is characterized in that said operation control system comprises a traveling vehicle-side control system which controls an operating state of the traveling vehicle and is provided on the amphibious traveling vehicle for traveling under water and in the air, a host-side control system which instructs the vehicle-side control system to operate the amphibious travel vehicle and is provided separately from the amphibious traveling vehicle, and communication means which transmits information between the vehicle-side control and host-side control systems; and said emergency escaping device comprises a capsule holding mechanism for holding integrally said vehicle capsule and said vehicle body and for releasing this holding state in an emergency, a wire coupling said vehicle body and said vehicle capsule, and resistant load device provided on said vehicle body for limiting the withdrawn quantity of said wire.

9. Operation control system of amphibious traveling vehicle according to claim 8, which is characterized in that said communication means consists of a modulator for modulating instruction information received from said vehicle-side control system an said host-side control system into light beams signals, a demodulator for demodulating received light beam signals into instruction information and a light beam transmitter/receiver, and in that information transmission between said control systems are performed trough light beams including near infrared beam or visible light beam of green-blue color system.

10. Operation control system of amphibious traveling vehicle according to claim 9, which is characterized in that said light beam transmitter/receiver on said vehicle-side control system comprises light shower movable station which generates light beams in radiation manner, while said light beam transmitter/receiver on said host-side control system comprises light shower fixed station which generates light beams in radiation manner.

* * * * *